US012130893B2

(12) United States Patent
Wang et al.

(10) Patent No.: US 12,130,893 B2
(45) Date of Patent: Oct. 29, 2024

(54) PRIVACY-PRESERVING CROSS-DOMAIN EXPERIMENTAL GROUP PARTITIONING AND MONITORING

(71) Applicant: Google LLC, Mountain View, CA (US)

(72) Inventors: Gang Wang, Frederick, MD (US); Marcel M. Moti Yung, New York, NY (US); Timothy David Lambert, Ontario (CA)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/924,897

(22) PCT Filed: Apr. 5, 2022

(86) PCT No.: PCT/US2022/023391
§ 371 (c)(1),
(2) Date: Nov. 11, 2022

(87) PCT Pub. No.: WO2022/256080
PCT Pub. Date: Dec. 8, 2022

(65) Prior Publication Data
US 2024/0232423 A1 Jul. 11, 2024

(30) Foreign Application Priority Data

Jun. 3, 2021 (IL) .......................................... 283674

(51) Int. Cl.
*G06F 21/10* (2013.01)
*G06F 21/62* (2013.01)
(52) U.S. Cl.
CPC .......... *G06F 21/10* (2013.01); *G06F 21/6245* (2013.01)
(58) Field of Classification Search
CPC .............................. G06F 21/10; G06F 21/6245
USPC .......................................................... 726/30
See application file for complete search history.

(56) References Cited

U.S. PATENT DOCUMENTS

| 9,679,314 | B1 | 6/2017 | Wang | |
|---|---|---|---|---|
| 2020/0027133 | A1* | 1/2020 | Segalov | ............. G06F 21/6263 |
| 2020/0336313 | A1* | 10/2020 | Knox | ..................... H04L 63/10 |

FOREIGN PATENT DOCUMENTS

| EP | 3419211 | 12/2018 |
|---|---|---|
| JP | 2016-517069 | 6/2016 |

(Continued)

OTHER PUBLICATIONS

International Preliminary Report on Patentability in International Appln. No. PCT/US2022/023391, mailed on Dec. 14, 2023, 10 pages.

(Continued)

*Primary Examiner* — Thanh T Le
(74) *Attorney, Agent, or Firm* — Fish & Richardson P.C.

(57) ABSTRACT

Methods, systems, and apparatus, including computer programs encoded on a computer storage medium, for privacy-preserving cross-domain experiment monitoring are described. In one aspect, a method includes receiving, by a first server of a MPC system, a request for digital content including a first secret share of an application instance identifier that identifies the application instance associated with the device. The first server conducts, in collaboration with a second server of the secure MPC system, a privacy-preserving selection process to select a winning digital component from a set of digital components. Each digital component has a corresponding unique experiment identifier and unique control identifier. A first secret share representing the winning digital component is generated. A response is generated and includes the first secret share of the selection result and data representing whether the application is in the experiment group or a control group for each digital component.

20 Claims, 6 Drawing Sheets

(56) References Cited

FOREIGN PATENT DOCUMENTS

| JP | 2020-510251 | 4/2020 |
| JP | 2020-523656 | 8/2020 |
| WO | WO 2020159591 | 8/2020 |

OTHER PUBLICATIONS

Notice of Allowance in Japanese Appln. No. 2022-570377, mailed on Feb. 5, 2024, 5 pages (with English translation).
Github.com [online], "Aggregated Reporting API" Oct. 2019, retrieved on Jan. 25, 2023, retrieved from URL <https://github.com/csharrison/aggregate-reporting-api>, 6 pages.
Github.com [online], "Dovekey" Sep. 2020, retrieved on Jan. 25, 2023, retrieved from URL <https://github.com/google/ads-privacy/tree/master/proposals/dovekey>, 9 pages.
Github.com [online], "dovekey_auction.md" Jan. 2021, retrieved on Jan. 25, 2023, retrieved from URL <https://github.com/google/ads-privacy/blob/master/proposals/dovekey/dovekey_auction.md>, 9 pages.
Helsloot et al., "BAdASS: Preserving Privacy in Behavioural Advertising with Applied Secret Sharing." International Conference on Provable Security. Springer, Cham, Oct. 25, 2018, 397-405.
IBM, "Method for Selecting Advertisements Respecting User Privacy" ip.com, IP.COM Inc., May 8, 2009, 7 pages.
International Search Report and Written Opinion in International Appln. No. PCT/US2022/023391, dated Jun. 30, 2022, 17 pages.
Wikipedia.org [online], "Bloom filter" created Apr. 2004, retrieved on Jan. 25, 2023, retrieved from URL <https://en.wikipedia.org/wiki/Bloom_filter>, 23 pages.

* cited by examiner

PRIVACY-PRESERVING CROSS-DOMAIN EXPERIMENTAL GROUP PARTITIONING AND MONITORING

CROSS-REFERENCE TO RELATED APPLICATIONS

This application is a National Stage Application under 35 U.S.C. § 371 and claims the benefit of International Application No. PCT/US2022/023391, filed Apr. 5, 2022, which claims the benefit of priority to Israeli Application Serial No. 283674, filed Jun. 3, 2021, both of which are incorporated by reference herein in their entireties and for all purposes.

TECHNICAL FIELD

This specification relates to data processing, cryptography, and privacy-preserving web activity analysis.

BACKGROUND

Persistent identifiers that can uniquely identify users across different experiments, domains, and requests allow experiments to be conducted using groups of users that are consistently exposed to a treatment or reserved as part of the control. However, existing monitoring mechanisms such as cookies are often used as persistent identifiers and can be linked to a single user and information about the user. Such vulnerabilities can make users feel like they can be too easily identified and their information is too easily compromised. Furthermore, cookies may provide more information than a user would like to share and be associated with to a particular content provider, host, or distributor.

SUMMARY

The enhancement of online user privacy has led many browser developers to change the ways in which user data is handled. For example, some types of cookies are no longer being supported by some browsers, but the deprecation of third party cookies may lead to less robust results from an experiment. The described systems and methods allow live experiments to be conducted by providing users with different forms of content across different domains and locations in a network even when cookies are not available. The described identifiers provide a privacy-preserving mechanism for allowing cross-domain experimental group partitioning and monitoring by allowing a system conducting experiments to consistently identify whether an application is part of an experiment group or a control group in an experiment, and thus providing accurate experiment results across different experiments and domains.

In general, one innovative aspect of the subject matter described in this specification can be embodiment in a method for privacy-preserving cross-domain experiment monitoring that includes receiving, by a first server of a secure multi-party computation (MPC) system and from an application on a user device, a request for digital content, wherein the request comprises a first secret share of an application instance identifier that identifies the application instance associated with the device, or the device itself, in response to receiving the request and by the first server of the secure MPC system, conducting, in collaboration with a second server of the secure MPC system, a privacy-preserving selection process to select a first winning digital component from among a set of digital components, wherein each digital component has a corresponding (i) unique experiment identifier and (ii) unique control identifier, the conducting including, for each digital component in the set of digital components, determining, in collaboration with the second server and based on a set of eligibility rules, a first secret share of a candidate parameter that represents whether the digital component is an eligible candidate for selection in the privacy-preserving selection process, and determining, in collaboration with the second server and based on the first secret share of the application instance identifier and respective first secret shares of candidate parameter values, a secret share of an experiment parameter that represents whether the application is in the experiment group for the digital component. The method includes generating, based on the first secret share of the candidate parameter for each digital component and a selection value for each digital component, a first secret share of a selection result representing the first winning digital component, generating the response to the request for digital content, the response including the first secret share of the selection result and, for each of one or more digital components including the first winning digital component, data representing whether the application is in the experiment group for the digital component or a control group for the digital component, and transmitting, by the first server of the secure MPC system and to the application on the user device, the response to the request for digital content.

In some implementations, the data representing whether the application is in the experiment group for the digital component or a control group for the digital component is represented by a Bloom filter. In some implementations, conducting a privacy-preserving selection process to select a first winning digital component includes, for each digital component in the set of digital components, adding, to the Bloom filter, a corresponding (i) unique experiment identifier if the application is in the experiment group, or (ii) unique control identifier if the application is in the control group.

In some implementations, determining whether the application is part of a control group or an experiment group with respect to each digital component includes determining, for each experiment of a set of experiments associated with the digital component, determining whether the application is part of a control group or an experiment group with respect to each digital component.

In some implementations, the set of eligibility rules includes two or more eligibility rules, one or more parameters of a first eligibility rule is determined based on an experiment design based on a number of mutually orthogonal Latin squares of a particular size, and the first eligibility rule specifies a first range of values for the one or more parameters. In some implementations, the method includes updating, based on the experiment design, the one or more parameters of the first eligibility rule to specify a second range of values for the one or more parameters, and conducting, by the first server of the secure MPC system and in collaboration with the second server of the secure MPC system, a counterfactual selection process to select a second winning selection criterion from among the set of selection criterion by applying the set of eligibility rules, including the updated first eligibility rule.

In some implementations, transmitting, by the first server of the secure MPC system and to the application on the user device, the response to the request for digital content includes receiving, by the first server of the secure MPC system and from the second server of the secure MPC system, an encrypted secret share of the response to the request for digital content, encrypting, by the first server of the secure MPC system, a second secret share of the response to the request for digital content to generate an encrypted second secret share of the response, and transmitting, by the first server of the secure MPC system and to the application on the user device, the encrypted secret share of the response and the encrypted second secret share of the response.

In some implementations, the set of eligibility rules includes one or more eligibility rules, the set of eligibility rules includes at least one positive condition, and the set of selection criteria are stored at the secure MPC system. In some implementations, the set of eligibility rules includes at least one negative condition.

In some implementations, attaching the unique experiment identifier associated with the selection criteria to a response to the request for digital content includes adding the unique experiment identifier to a list of unique identifiers included with the response, and attaching the unique control identifier associated with the selection criteria to the response to the request for digital content includes adding the unique control identifier to the list of unique identifiers, where the list of unique identifiers is represented using a Bloom filter. In some implementations, the method includes transmitting, by the application and to a platform associated with the selected digital component, a first report including the list of unique identifiers, and uploading, by the platform associated with the selected digital component to an aggregate reporting server, a batch of one or more reports that includes the first report. In some implementations, the method includes transmitting, by the application and to an aggregate reporting server, a first report including the list of unique identifiers.

Other embodiments of this aspect include corresponding systems, apparatus, and computer programs, configured to perform the actions of the methods, encoded on computer storage devices.

The subject matter described in this specification can be implemented in particular embodiments so as to realize one or more of the following advantages.

The selection and presentation of digital content is often updated and improved through the use of experiments that test for changes in user reaction to or reception of digital content based on changes to the content. User-based experiments, in which the effect of a particular feature or presentation format on a user receiving the content is measured is a vital technique for evaluating how a user's experience is affected. Such experiments also allow content researchers, providers, developers, and other entities to quantify the incremental effects of particular features and changes under development and to improve the effectiveness and target key performance indicators for providers. For example, the experiments allow content providers to measure metrics and the effects of the selection and presentation of particular digital content on particular metrics, such as publisher revenue or advertiser reach and audience size and demographics.

The ways in which digital content systems select and implement changes to content such as digital components (e.g., generate experimental or incremental changes to digital components) have historically included using user information (e.g., browsing information, interest group information, etc.) obtained from third-party cookies, which are cookies stored on the client device by a domain that differs from the domain of the web page being rendered on the client device. In the context of experiments designed and executed to test digital content design and presentation or other digital experiments, these third party cookies allow for the consistent designation of a particular user as part of a control group or a treatment group that is exposed to a treatment (such as different content or format of content). However, browsers are blocking the use of third party cookies, making it more difficult to consistently assign users to control groups or groups exposed to treatment, meaning that computing resources and bandwidth may be wasted by assigning users to conflicting groups and producing less accurate, or inaccurate, results. When users are not consistently assigned to groups, results may not be accurate because a user can be exposed to treatment in one experiment on one publisher's site and exposed to the control for the same experiment later on a different publisher's site, which could confuse the results, rendering the results obtained from performing the experiment unreliable and/or unusable. When the control or treatment is inconsistently provided, the content may be irrelevant, and new content would need to be provided or a new experiment would need to be conducted, which may require the experiment to be performed on different users or using different content, causing additional traffic while rendering previously provided traffic ineffective.

To overcome this problem, privacy preserving techniques for stable cross-domain identifiers that are used only for the purposes of conducting experiments enable the monitoring and analysis of web activity, while impeding the tracking of users, and while preventing the leakage of user information across computing systems can be used, thereby enabling the vital experiments while also preserving user privacy and data security.

The described privacy-preserving monitoring mechanism—privacy-preserving experiment identifiers, or "peids"—improves the user experience and increases user trust by providing privacy guarantees that ensure that this mode of monitoring user data and activity is not accessible to any third parties while still offering the benefits of being able to perform robust research methodologies, including experiments and testing of various content and presentation methods. The described system includes a group of secure servers that performs multi-party computation, a cryptographic protocol which distributes computation across multiple parties such that no individual party has access to the data in plaintext. This ensures that, absent unauthorized collusion between the parties, that user data is not accessible to either participating party in cleartext. The described system can support cross-device stable partitioning of experiment groups (e.g., control group vs. experiment group) if, for example, applications (such as web browsers) on different devices belonging to the same user can synchronize with each other to use the same peid. The described system supports same-device cross-domain experiment partitioning, and with cross-device synchronization of peid, can also support cross-device experiment partitioning.

Furthermore, these experiment identifiers may be used as a replacement in systems using traditional methods of web activity monitoring. For example, peids can be used in existing systems with little adaption required under certain conditions, allowing system designers to re-use existing infrastructures for providing relevant statistical data regarding web activity and performing security functions to protect third parties while improving user privacy.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
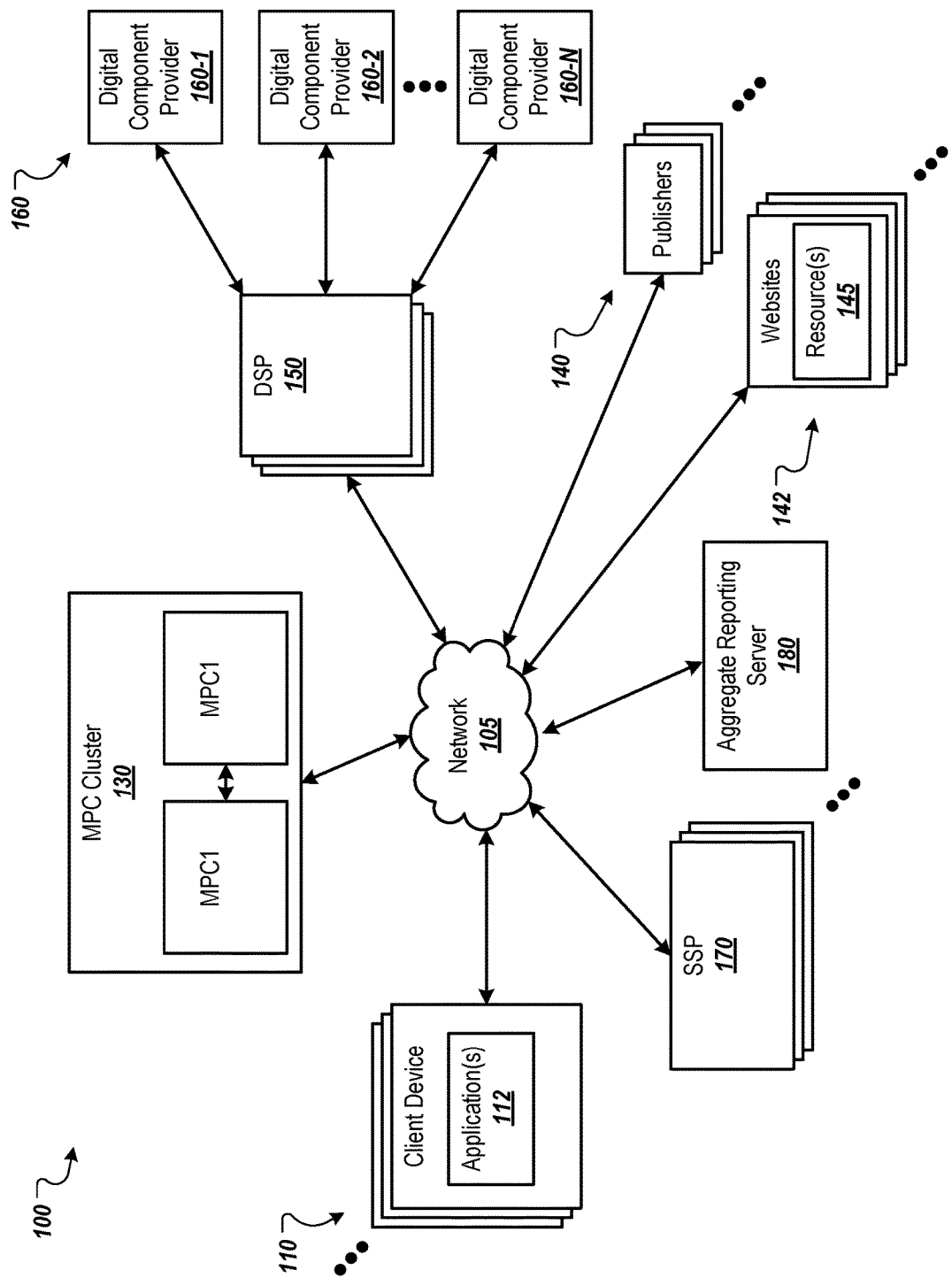
FIG. 1 is a block diagram of a system in which a privacy-preserving cross-domain experimental group partitioning and monitoring mechanism is implemented.

In general, this document describes systems and techniques for protecting user data and preserving privacy for users to whom content is provided in the context of an experiment.

Live experiments based on user groups is a vital technique widely adopted by different companies. Experiments can be used to evaluate the effectiveness and user experience of new features under development and to quantify the incremental effect of particular changes. For example, experiments can be used to quantify how much more likely a user would be to go to a concert performed by a particular orchestra after being shown, for example, a particular promotional video of a portion of a program from a previous season. Without stable, cross-domain, deterministic identifiers for the users, existing systems for conducting cross-domain user-based live experiments may not be effective when monitoring mechanisms such as third-party cookies are deprecated. The systems and techniques described in this document enable such experiments while ensuring data security and user privacy.

Although alternative solutions for performing user-based live experiments exist, they may not be robust or accurate. For example, it is possible to conduct request-based experiments, in which each request for content is randomly or pseudo-randomly assigned to an experimental group. It is also possible to conduct user-based experiments based on first party cookies. However, in both of these cases, if a user using a particular browser visits different domains and sends out multiple requests for content, the browser could be assigned to the control group at one time and an exposed group at another time. When a user is inconsistently assigned to experiment groups, the effect of the variable being tested may spill over between experiment and control groups, causing inaccurate and therefore unusable results.

In some implementations, it is possible to conduct user based experiments by using information such as a user's email address or phone number, which would allow for consistent, cross-domain and cross-browser tracking. However, users may have concerns regarding the usage of their personally identifiable information for any purpose, including the assignment of users to experiment groups, even if the data is not exposed to any other entities.

The described system presents a secure multi-party computational design that provides information security and privacy. Secure multi-party computation (MPC) is a cryptographic protocol that prevents access to data by distributing a computation across multiple parties such that no individual party can access another party's data. MPC allows parties to jointly compute a function over their individual inputs while keeping those inputs private. MPC systems perform computations by splitting data that should be kept private into shares. This data, referred to as a secret, is split into secret shares, and each of these shares is provided to a participating party. The parties then jointly compute a function over their individual secret shares, ensuring data confidentiality, integrity and security. An MPC system includes a cluster of two or more server computers that jointly and securely perform various computations and processes.

For example, the system can distribute the experimental design functions, such as assigning particular peids to either control or treatment groups and securely transmitting the peids for use in experiments. The MPC cluster offers improved process integrity and user privacy over performing the process at the requesting client device, which requires the transmission of securely selected candidate digital components from the MPC cluster to the client device. The MPC process provides security to the extent that if just one of the participating parties, which are presumed to be non-colluding, remains honest and does not deviate from the cryptographic protocol design, there is no way for the user data to be exposed to any entity. The system follows the honest-but-curious security model in which all parties follow the protocol honestly and the protocol remains private if any number of parties colluding learn nothing beyond their own outputs.

By implementing this system in which stable identifiers are used only for experimental purposes and are transmitted through a secure MPC method, systems can maintain experiment integrity and the utility of experimental results while preserving user privacy, providing content that is more likely to be relevant to a user and in a way that is more likely to be interesting and/or useful to a user.

The described system enhances the operation of a secure MPC design by providing a stable experiment identifier that can support cross-domain user-based experiments, and where peids are synced across multiple devices owned by the same user, support cross-device user-based experiments. Applications, such as browsers, through which users access particular electronic documents and resources share the stable experiment identifier with the secure MPC cluster, which can use the identifier to enable or disable various experiments and experimental features, determine which of various stored selection criteria are eligible or ineligible for selection to be presented to a user, to assign users to different experiment groups, track the results of experiments, and to report those results for use, among other functions. The secure MPC cluster reports experiments that are enabled to an aggregated reporting server for analysis. In some implementations, the secure MPC cluster performs the reporting via the browser, or the secure MPC cluster itself can act as the aggregated reporting server.

Additionally, in order to support the measurement of incremental updates and changes, the secure MPC cluster conducts counterfactual selection processes to determine whether the user of the browser belongs to a holdback group (i.e., the control group to which the treatment features are not provided) of the winning selection criterion in the selection process if the winning selection criterion and associated digital component is part of an incremental experiment or study. In the response to a request for a digital component, the secure MPC cluster can request that the application, e.g., browser, recognize that it belongs to either the exposed group or the holdback group, if applicable. The application reports back, via an aggregate reporting server, whether the associated behavior (such as visiting a website, purchasing tickets to a symphony, signing an e-birthday card) occurs within the conversion window of all exposed and holdback groups with which the application is associated.

FIG. 1 is a block diagram of an environment 100 in which an MPC cluster 130) performs a secure MPC process to select digital components for distribution to client devices 110 and performs experiments based on different content and versions of content. The example environment 100 includes a data communication network 105, such as a local area network (LAN), a wide area network (WAN), the Internet, a mobile network, or a combination thereof. The network 105 connects the client devices 110, the secure MPC cluster 130, publishers 140, websites 142, content platforms, e.g., supply-side platforms (SSPs) 170 and demand-side platforms (DSPs) 150, and an aggregate reporting server 180. The example environment 100 may include many different client devices 110, secure MPC clusters 130, publishers 140, websites 142, DSPs 150, SSPs 170, and aggregate reporting servers 180.

A client device 110 is an electronic device that is capable of communicating over the network 105. Example client devices 110 include personal computers, mobile communication devices, e.g., smart phones, and other devices that can send and receive data over the network 105. A client device can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually present information. The digital assistant can be implemented in different forms of hardware devices including, a wearable device (e.g., watch or glasses), a smart phone, a speaker device, a tablet device, or another hardware device. A client device can also include a digital media device, e.g., a streaming device that plugs into a television or other display to stream videos to the television, a gaming console, or a virtual reality system.

A client device 110 typically includes applications 112, such as web browsers and/or native applications, to facilitate the sending and receiving of data over the network 105. A native application is an application developed for a particular platform or a particular device (e.g., mobile devices having a particular operating system). In some implementations, application 112 can be a program such as an operating system. Publishers 140 can develop and provide, e.g., make available for download, native applications to the client devices 110. A web browser can request a resource 145 from a web server that hosts a website 142 of a publisher 140, e.g., in response to the user of the client device 110 entering the resource address for the resource 145 in an address bar of the web browser or selecting a link that references the resource address. Similarly, a native application can request application content from a remote server of a publisher.

Some resources, application pages, or other application content can include digital component slots for presenting digital components with the resources 145 or application pages. As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page or other resource presented by the application 112. More specifically, the digital component may include digital content that is relevant to the resource content (e.g., the digital component may relate to the same topic as the web page content, or to a related topic). The provision of digital components can thus supplement, and generally enhance, the web page or application content.

When the application 112 loads a resource (or application content) that includes one or more digital component slots, the application 112 can request a digital component for each slot. In some implementations, the digital component slot can include code (e.g., scripts) that cause the application 112 to request a digital component from an MPC cluster, such as the MPC cluster 130, that selects a digital component and provides the digital component to the application 112 for presentation to a user of the client device 110. As described below; the application 112 can request digital components from the MPC cluster 130, which can forward the request or partial information of the request to other servers, such as an SSP 170.

Some publishers 140 use an SSP 170 to manage the process of obtaining digital components for digital component slots of its resources and/or applications. An SSP 170 is a technology platform implemented in hardware and/or software that automates the process of obtaining digital components for the resources and/or applications. Each publisher 140 can have a corresponding SSP 170 or multiple SSPs 170. Some publishers 140 may use the same SSP 170.

Digital component providers 160 can create (or otherwise publish) digital components that are presented in digital component slots of publisher's resources and applications. The digital component providers 160 can use a DSP 150 to manage the provisioning of its digital components for presentation in digital component slots. A DSP 150 is a technology platform implemented in hardware and/or software that automates the process of distributing digital components for presentation with the resources and/or applications. A DSP 150 can interact with multiple supply-side platforms SSPs on behalf of digital component providers 160 to provide digital components for presentation with the resources and/or applications of multiple different publishers 140. In general, a DSP 150 can receive requests for digital components (e.g., from an SSP), generate (or select) a selection criterion for one or more digital components created by one or more digital component providers based on the request, and provide data related to the digital component (e.g., the digital component itself) and the selection parameter to an SSP. The selection criterion can indicate an amount that the digital component provider 160 is willing to provide for presentation or user interaction with the digital component. The SSP can then select a digital component for presentation at a client device 110 and provide, to the client device 110, data that causes the client device 110 to present the digital component.

In some cases, it is beneficial to a user to receive digital components related to web pages, application pages, or other electronic resources previously visited and/or interacted with by the user. In order to distribute such digital components to users, the users can be assigned to user groups, such as user interest groups, cohorts of similar users, or other group types involving similar user data, when the users visit particular resources or perform particular actions at the resource (e.g., interact with a particular item presented on a web page or add the item to a virtual cart). The user groups can be generated by the digital component providers 160. That is, each digital component provider 160 can assign users to their user groups when the users visit electronic resources of the digital component providers 160. The user groups can also be created by the content platforms, e.g., by DSPs 150 and/or SSPs 170.

To protect user privacy, a user's group membership can be maintained at the user's client device 110, e.g., by one of the applications 112, or the operating system of the client device 110, rather than by a digital component provider, content platform, or other party. In a particular example, a trusted program (e.g., a web browser or the operating system can maintain a list of user group identifiers ("user group list") for a user using the web browser or another application (e.g., for a user logged into the browser, application, or the client device 110). The user group list can include a group identifier for each user group that includes the user as a member. The digital component providers 160 that create the user groups can specify the user group identifiers for their user groups. The user group identifier for a user group can be descriptive of the group (e.g., gardening group) or a code that represents the group (e.g., an alphanumeric sequence that is not descriptive). The user group list for a user can be stored in secure storage at the client device 110 and/or can be encrypted when stored to prevent others from accessing the list.

When the application 112 presents a resource or application content related to a digital component provider 160, or a web page on a website 142, the resource can request that the application 112 add one or more user group identifiers to the user group list. In response, the application 112 can add the one or more user group identifiers to the user group list and store the user group list securely.

The MPC cluster 130 can use data, including user group membership of a user, to select digital components or other content that may be of interest to the user or may be beneficial to the user/user device in another way. For example, such digital components or other content may include data that improves a user experience, improves the running of a user device or benefits the user or user device in some other way. However, the user group identifiers of the user group list of a user can be provided and used to select digital components in ways that prevent the computing systems MPC1 and MPC2 of the MPC cluster 130 from accessing the user group identifiers for the user in cleartext, thereby preserving user privacy when using user group membership data to select digital components. Cleartext is text that is not computationally tagged, specially formatted, or written in code, or data, including binary files, in a form that can be viewed or used without requiring a key or other decryption device, or other decryption process. The MPC cluster 130 also performs a final selection process using a set of candidate selection criteria received from the SSP 170 to select a winning selection criterion mapped to a digital component. The MPC cluster 130 then provides data for a digital component mapped to the winning selection criterion directly to client device 110 in response to the digital component request. The data can include, for example, data identifying the digital component, a location at which the digital component is stored and/or from which the digital component can be requested, and the winning selection criterion, among other parameters. In some implementations, the MPC cluster 130 provides the digital component itself to the client device 110.

The secure MPC cluster 130 includes two computing systems MPC1 and MPC2 (e.g., server computers) that perform secure MPC processes to select digital components for distribution to client devices of users based on the user's group membership and/or other criteria, but without accessing the group membership information (or other sensitive user information) in cleartext. Although the example MPC cluster 130 includes two computing systems, more computing systems can also be used as long as the MPC cluster 130 includes more than one computing system. For example, the MPC cluster 130 can include three computing systems, four computing systems, or another appropriate number of computing systems. Using more computing systems in the MPC cluster 130 can provide more security, but can also increase the complexity of the MPC processes.

The computing systems MPC1 and MPC2 can be operated by a single entity. In some implementations, MPC1 and MPC2 can be operated by different entities. In this way, each entity may not have access to the users group membership in cleartext. For example, one of the computing systems MPC1 or MPC2 can be operated by a trusted party different from the users, the publishers 140, the DSPs 150, the SSPs 170, the aggregate reporting server 180, and the digital component providers 160. For example, an industry group, governmental group, or browser developer may maintain and operate one of the computing systems MPC1 and MPC2. The other computing system may be operated by a different one of these groups, such that a different trusted party operates each computing system MPC1 and MPC2. Preferably, the different parties operating the different computing systems MPC1 and MPC2 have no incentive to collude to endanger user privacy. In some implementations, the computing systems MPC1 and MPC2 are separated architecturally and are monitored to not communicate with each other outside of performing the secure MPC processes described in this document.

Further to the descriptions throughout this document, a user may be provided with controls (e.g., user interface elements with which a user can interact) allowing the user to make an election as to both if and when systems, programs, or features described herein may enable collection of user information (e.g., information about a user's social network, social actions, or activities, profession, a user's preferences, or a user's current location), and if content or communications are transmitted to the user from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 2:
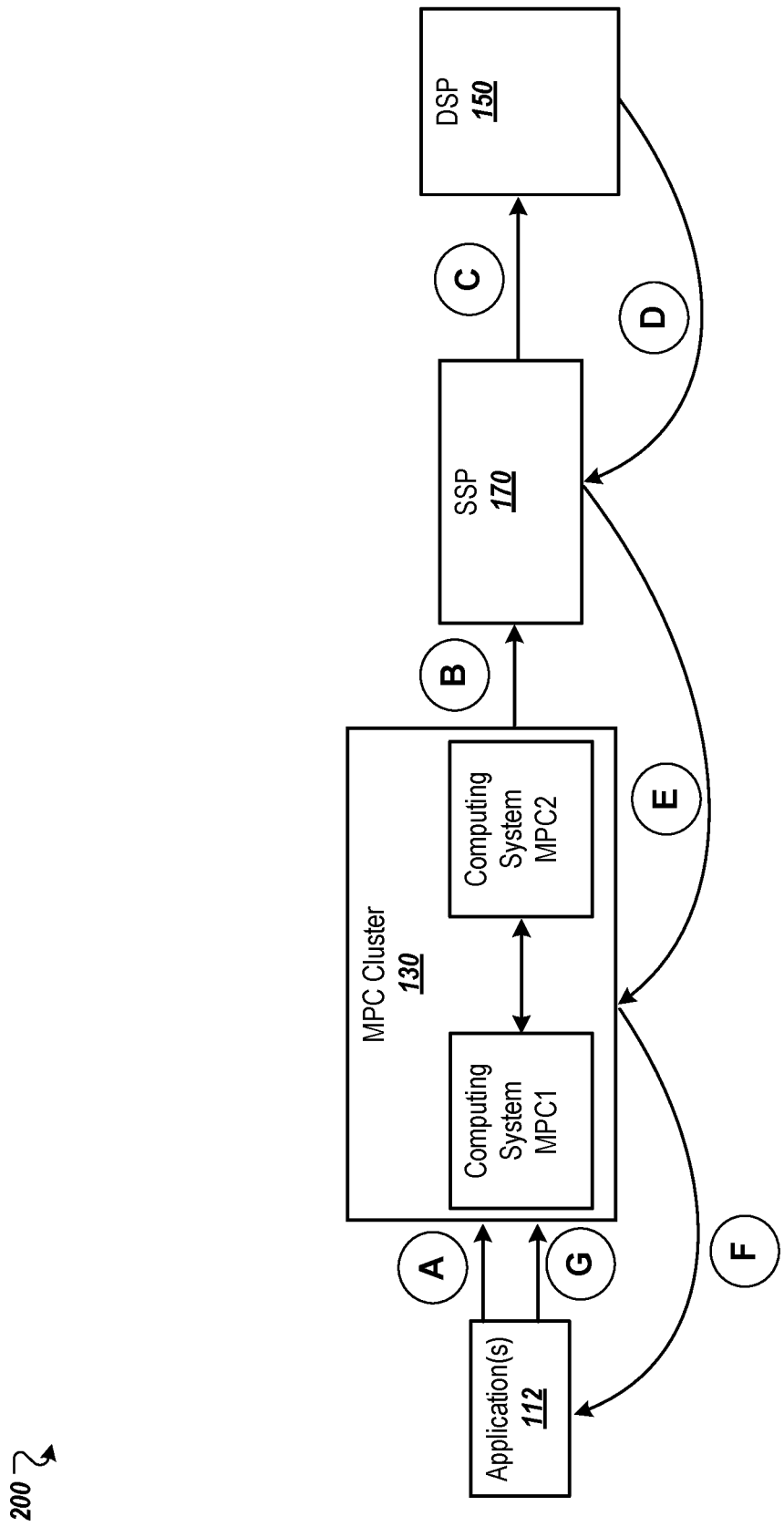
FIG. 2 is a data flow diagram of an example process for selecting a digital component for providing for display at or distribution to a client device.

FIG. 2 is a data flow diagram of an example process 200 for selecting a digital component for providing for display at or distribution to a client device. Operations of the process 200 can be implemented, for example, by the application 112 on the client device 110, the computing systems MPC1 and MPC2 of the MPC cluster 130, DSP 150, and SSP 170. Operations of the process 200 can also be implemented as instructions stored on one or more computer readable media which may be non-transitory, and execution of the instructions by one or more data processing apparatus can cause the one or more data processing apparatus to perform the operations of the process 200. Although the process 200 and other processes below are described in terms of a two computing system MPC cluster 130, MPC clusters having more than two computing systems can also be used to perform similar processes.

This description includes two types of selection criteria-selection criteria that are conditioned on either sensitive user information, such as user group membership or other business sensitive information, or parameters whose changes in value can allow unscrupulous parties to infer the sensitive information, or "conditional selection criteria" and selection criteria that are not conditioned on sensitive information, or "unconditional selection criteria." To protect user privacy, the conditions for "conditional selection criteria" are evaluated within MPC cluster 130 instead of SSP 170 or DSP 150 to determine whether digital components corresponding to conditional selection criteria are eligible for the content selection process.

This structure allows the MPC cluster 130 to protect user privacy and business confidential information, and to prove its trustworthiness to application providers, such as a provider of application 112. In this example, the MPC cluster 130 relies on secure 2-Party computation (2PC) architecture, which applies cryptography techniques to guarantee that, if at least one of the two computing systems of the MPC cluster 130 is honest, there is no leaking of confidential user data or business confidential information. If the MPC cluster 130 includes more than two computing systems, the current MPC protocol can be expanded, or other MPC protocols can be used.

The MPC cluster 130 runs the secure 2PC protocol to evaluate and apply conditions to select eligible selection process candidates, conduct selection processes to select a digital component based on a winning selection criterion (e.g., where the digital component is mapped to the winning selection criterion), and to receive impression notifications to update counters on which those conditions depend. All of these processes can be done using secret sharing techniques. This protocol is described in detail below.

The process 200 begins with stage A, in which application 112, in collaboration with a triggering element from a content distribution server, such as SSP 170, sends a request for a digital component to the MPC cluster 130. The application 112 can include multiple requests for digital components together into one combination request to fetch multiple digital components. The MPC cluster 130 can then serve each request in the combination request independently, or make one or more selection decisions holistically. In this example, the request is for a single digital component, and includes a request for a digital component that is selected based on sensitive information or a digital component that is selected without using sensitive information.

The MPC cluster 130 can respond to the request by selecting a particular digital component from among a set of digital components that are each mapped to respective selection criteria. These selection criteria can be selection criteria for digital components that were previously cached, or otherwise stored, at the MPC cluster 130) and/or selection criteria generated by a platform, such as DSP 150 or SSP 170, just-in-time (JIT) selection criteria. JIT selection criteria are generated directly in response to need, and increase efficiency and decrease waste, because the selection criteria are only generated when a digital component is needed. For example, JIT selection criteria can be generated when a digital component slot becomes available—this is indicated by the receipt of a request for a digital component. A cached digital component is one for which a selection criterion is stored by the MPC computers, but the digital component may not necessarily be stored in a cache, e.g., the digital component or data for the digital component can be stored in other types of data storage devices or memory.

The request contains information used in a digital component selection process, including information that can be sensitive, such as identifiers of user groups to which the application 112 is mapped or otherwise associated, and information that is not sensitive, such as contextual signals from the application 112 regarding the context in which the digital component will be presented and/or displayed. As described in further detail below, the design of system 110 improves the protection of user data that can be sensitive or confidential. The request contains a stable experiment identifier, a peid, that can be used to select or remove selection criteria and associated digital components from the selection process. The stable experiment identifier can correspond to the instance of the application 112 running on the client device 110 which can, in turn, correspond to the user, e.g., the user logged into the application 112 or that is using the application 112. The stable experiment identifier is encrypted using a secret shares technique supported by the MPC cluster 130 to protect user privacy, such that no single server of the MPC cluster 130 knows the identifier, and instead holds shares of the identifier. The application 112 can send respective shares of the stable experiment identifier to each server of the MPC cluster 130.

The triggering element can be, for example, a tag that detects the presence of a digital component slot within an internet location or other electronic resource visited by application 112. The triggering element can be placed, for example, at the internet location and can inform the application 112 of the presence of a digital component slot for which a digital component should be requested.

The process 200 continues with stage B, in which the MPC cluster 130 transmits a digital component request that is based on information that is not (or less) sensitive, such as contextual signals, to SSP 170. For example, a digital component request can be based on information such as user activity information within a particular domain. This request is referred to as a "contextual request," and responses to this contextual request can be unconditional selection criteria, because the request is not conditioned on receiving sensitive information. In some cases, the response may include criteria for one or more conditions such that the response is a conditional response. The contextual request can contain various contextual signals and user information gathered directly by the internet location (e.g., a content publisher) that triggered the request for a digital component. For example, the contextual signals can include analytics data, language settings, and other data that assist the content publisher with providing a good user experience. The contextual request provided to SSP 170 does not, however, include sensitive information, such as user group identifiers.

The process 200 continues with stage C, in which SSP 170 forwards the contextual request to one or more DSPs 150. In this particular example, and for simplicity, SSP 170 forwards the contextual request to a single DSP 150. For example, SSP 170 can forward the contextual request to DSP 150. In this example, DSP 150 has digital components and selection criteria mapped to the digital components.

The process 200 continues with stage D, in which the one or more DSPs 150 return selection criteria in response to the contextual request. For example, DSP 150 returns one or more selection criteria mapped to digital components responsive to the contextual request. DSP 150 can return any number of selection criteria responsive to the contextual request. In some implementations, DSP 150 can additionally return selection criteria responsive to a digital component request based on sensitive information, such as user group information. These selection criteria are "conditional selection criteria" because they are conditioned on sensitive information, and thus are conditioned on the MPC cluster 130 receiving a request that includes sensitive information matching the sensitive information on which the selection criteria are conditioned. For each selection criterion that DSP 150 provides, DSP 150 includes information such as a time-to-live (TTL) parameter, i.e. the maximum timespan that the MPC cluster 130 may cache the selection criterion. This TTL parameter enables the MPC cluster 130 to cache selection criteria received from DSP 150. In some implementations, without a TTL parameter, the MPC cluster 130 does not cache received selection criteria, and instead will discard the selection criteria after the selection criteria have been used in a selection process, e.g., in the selection process corresponding to the digital component request transmitted in stage A, B and C.

The process 200 continues with stage E, in which SSP 170 applies content selection rules. For example, SSP 170) applies rules such as content provider and digital component blocking rules, that prevent particular content providers from being eligible to provide candidate digital components and selection criteria, or particular digital components from being candidates. In some implementations, the MPC cluster 130 can apply the rules or a portion of the rules.

In some implementations, the application 112 can maintain a set of blocked identifiers that includes identifiers of digital components that have been expressly blocked by the user. For example, assume that a user interacts with a mute element corresponding to a given digital component (or a portion of data that was delivered to the client device 110). In this example, the user's interaction with the mute element is an indication that the user does not want to see that digital component, or potentially similar digital components (e.g., from a content source or campaign, which can be the same content source or campaign or can be a different content source or campaign), in the future (e.g., for at least a certain amount of time). In response to the interaction the application 112 can add the identifier for the given digital component to the set of blocked universal identifiers, which can then be used to prevent delivery or presentation of other digital components having the same identifier as the given digital component. In some implementations, the application 112 can maintain a set of blocked identifiers that includes identifiers of digital components that have been shown to the user too often recently e.g. more than X times during the most recent Y minutes. The application 112 can add the identifier for the given digital component to the set of blocked universal identifiers, which can then be used to prevent delivery or presentation of other digital components having the same identifier as the given digital component in the near future.

SSP 170 also applies selection criterion rules to determine, for example, how selection criteria affect post-publishing values for particular content providers. Post-publishing values can indicate, for example, an amount that is provided to a content provider for publishing the digital component. The SSP 170 then performs a selection process to determine a top unconditional selection criterion, the unconditional selection criterion that yields the highest post-publishing value. An unconditional selection criterion is not conditioned on sensitive information, and therefore content selection rules such as user group membership, frequency control, content distribution rules, and pacing rules are not applied. The SSP 170 then forwards the following, which are JIT selection criteria, to the MPC cluster 130; all selection criteria that enable caching in the MPC cluster 130 (selection criteria having TTL values) and all selection criteria whose post-publishing value is no less than the post-publishing value of the top unconditional selection criterion.

The process 200 continues with stage F, in which the MPC cluster 130 updates its cache with digital components and their corresponding JIT selection criteria received that enable caching (i.e., have TTL values). In addition, the MPC cluster 130 applies selection rules for conditions, such as user membership rules, frequency control, pacing rules, and rules to prevent micro-targeting of a particular user to all selection criteria received in stage E, as well as to selection criteria for previously cached digital components to select valid candidates for the selection process. The rules can include restrictions and guidelines on the manner or frequency of distribution of a digital component, among other factors. The rules include frequency control, muting, budget, and pacing constraints. The MPC cluster 130) then runs the final selection process among all valid candidates, selects a winning digital component, and then returns data for the winning digital component to the application 112 in response to the digital component request.

The process 200 continues with stage G, in which the winning digital component is rendered by application 112. Application 112 then provides an impression notification to the MPC cluster 130. This impression notification includes data that allows the MPC cluster 130 to update information relevant to updating counters that allow the MPC cluster 130 to enforce selection rules. In some implementations, application 112 may send the impression notification G to MPC cluster 130 by piggy-back on top of, e.g., included with, a future component request A to reduce the number of network communications and battery/bandwidth consumption for mobile devices.

The system implements a secret shares algorithm to prevent any individual server in the MPC cluster from accessing user information, such as the peid. When the system is operating under the honest-but-curious assumption, the secret shares algorithm guarantees that no single server in the MPC is able to see the peid in cleartext. More specifically, for each digital component request, the browser 112 splits the peid into two secret shares, [$peid_1$] and [$peid_2$], where parameters appearing within brackets represent secret shares of the variable within the brackets. For example, here [$peid_1$] and [$peid_2$] are the two secret shares of peid, the stable experiment identifier for the user. With respect to secret shares, the subscript 1 indicates a parameter representing a first secret share and the subscript 2 indicates a parameter representing a second secret share. These secret shares can be reconstructed into the original secret. For example, an entity can reconstruct the secret shares [$peid_1$] and [$peid_2$] into the original secret peid only if the entity has access to both [$peid_1$] and [$peid_2$]. However, the secret shares are encrypted in order to protect user privacy.

By relying on schemes such as additive secret sharing, the reconstruction process can be performed using simple operations. For example, the reconstruction process when using simple additive secret sharing can be performed using a simple additive operation such as $[peid_1]+[peid_2]=peid$. Each of the two secret shares is held separately and confidentially by one of the two servers of the MPC cluster 130, respectively. The sharing of the peid between the servers is by additive sharing. The peid can be shared through other methods, such as through two random vectors, the exclusive-or of which gives the peid, or through two separate shares in which one share holds the encrypted peid and the second share holds the decryption key, among other methods. The MPC cluster 130 can adapt to perform the splitting of the secret into shares based on the particular method selected.

In order to guarantee that a secret share intended for one server is not intercepted by the other server, the secret shares can be encrypted. For example, application (which could be a browser) 112 can encrypt each of the secret shares with the public key of the particular MPC server intended to receive the secret share by sending the result of PublicKeyEncrypt ($[peid_1]$, $MPC_1$) to $MPC_1$ and sending the result of PublicKeyEncrypt ($[peid_2]$, $MPC_2$) to $MPC_2$. Here, PublicKeyEncrypt(x, y) represents an encryption function performed on x using the public key of the server y. Thus, PublicKeyEn ($[peid_1]$, $MPC_1$) represents an encryption function performed on $[peid_1]$ using the public key of $MPC_1$.

Figure 3:
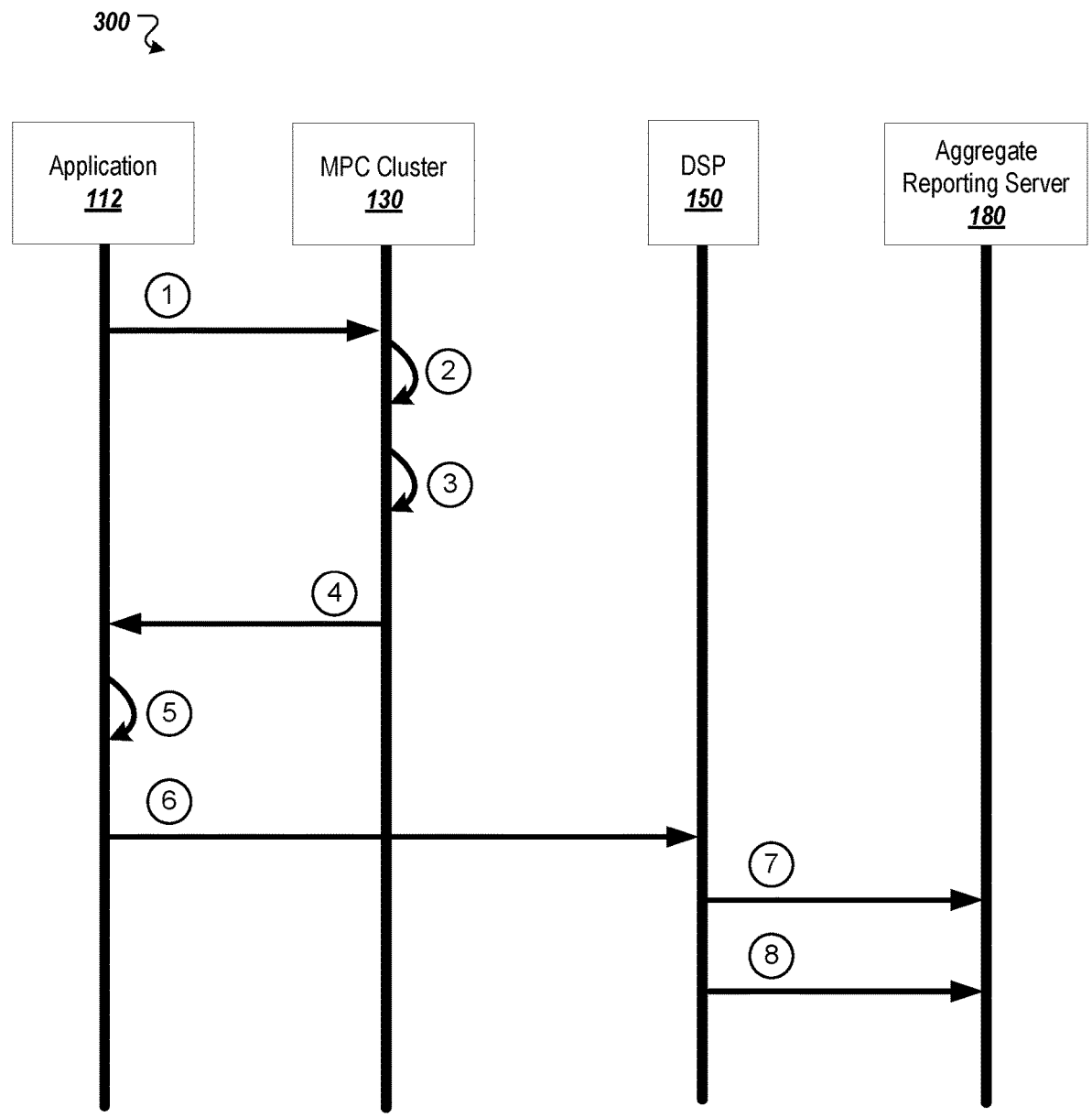
FIG. 3 is a swim lane diagram that illustrates an example process for issuing and implementing a privacy-preserving cross-domain experimental group partitioning and monitoring mechanism to report experiment data.
Figure 4:
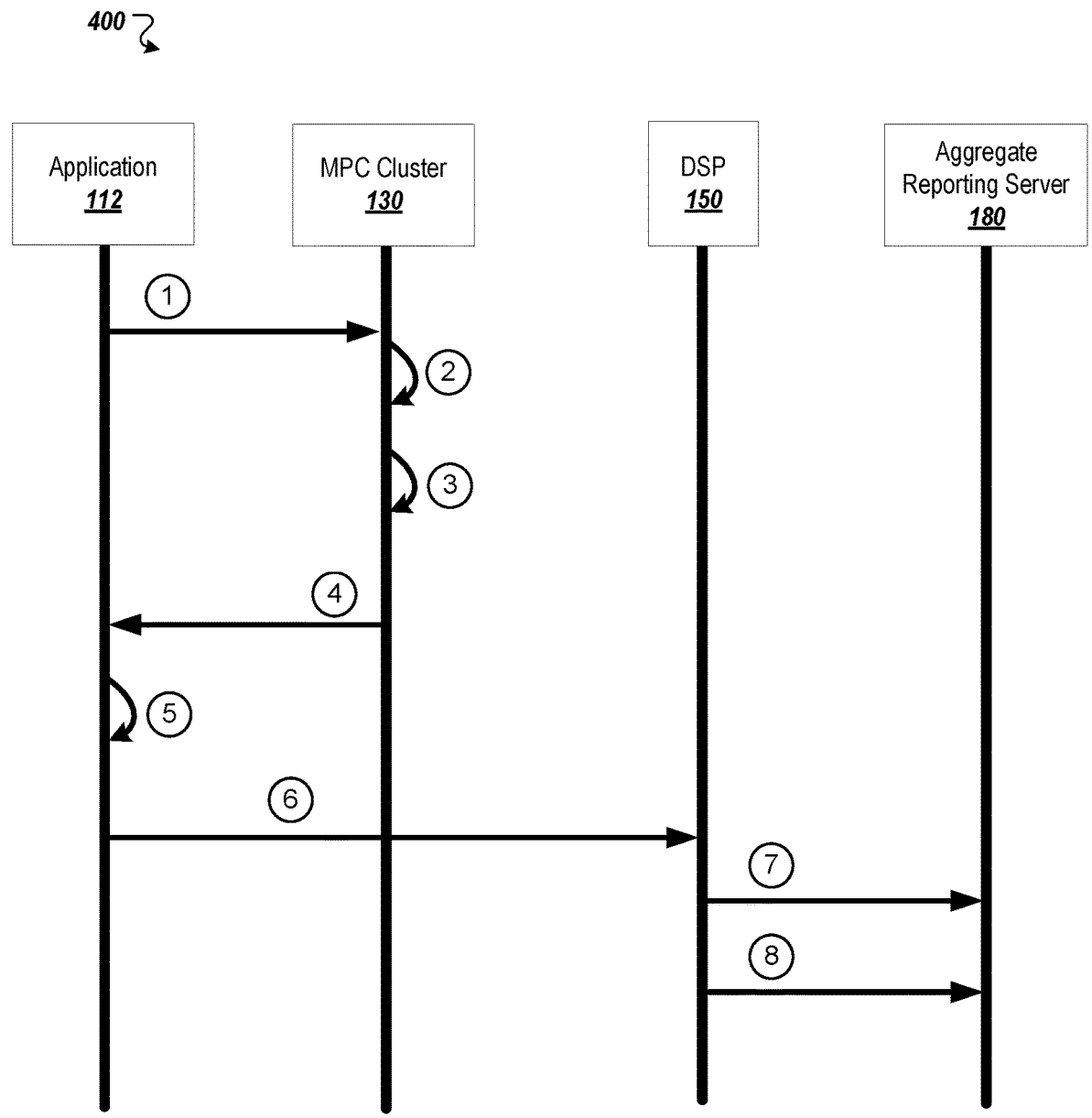
FIG. 4 is a swim lane diagram that illustrates an example process for issuing and implementing a privacy-preserving cross-domain experimental group partitioning and monitoring mechanism to support incrementality in experiments.

FIGS. 3 and 4 are swim lane diagrams that illustrate example processes 300 and 400 for issuing and implementing a privacy-preserving cross-domain experimental group partitioning and monitoring mechanism that is used across web activity performed across different domains. Operations of the processes 300 and 400 can be implemented, for example, by client device 110 and/or application 112, MPC cluster 130, DSP 150, and/or aggregate reporting server 180. Operations of the processes 300 and 400 can also be implemented as instructions stored on one or more computer readable media which may be non-transitory, and execution of the instructions by one or more data processing apparatus can cause the one or more data processing apparatus to perform the operations of the processes 300 and 400.

With respect to FIG. 3, process 300 begins with step 1, in which application 112 sends a request for a digital component to the MPC cluster 130. For example, step 1 of process 300 may be similar to stage A of process 200, in which application 112, in collaboration with a triggering element from a content distribution server, sends a request for a digital component to the MPC cluster 130. The request can include, for example, a set of contextual signals related to the display environment in which the selected digital component will be displayed. The request can also include, for example, the peid for the user and application 112 such that the user can be uniquely identified for purposes of any experiments conducted. The contextual signals can include, for example, a resource locator (e.g., Universal Resource Locator (URL)) for the resource with which the digital component will be displayed, the geographic location of the client device 110 at which the digital component will be displayed, and/or a spoken language setting for the application 112 with which the digital component will be displayed. Other contextual signals can also be used.

In some implementations, the set of contextual signals are sent in the form of a parameter such as a cache lookup key. The cache lookup key can be a composite message that is based on the set of contextual signals. In some implementations, the cache lookup key can be the crypto hash (e.g., SHA-256) of the composite message.

The MPC cluster 130 can store, for each digital component for which selection criteria is or stored, by the MPC cluster 130, a corresponding cache lookup key that indicates the context in which the digital component is eligible for selection. For example, if a selection criterion for a digital component is only eligible for use in selection processes for a given URL, the selection criterion and digital component can be mapped to a cache lookup key that includes the given URL. These cache lookup keys can also be in the form of a composite message.

For an incoming request for a digital component, the MPC cluster 130 collects all cached selection criteria associated with a cache lookup key included in the digital component request. That is, the MPC cluster 130 identifies each digital component and its corresponding selection criterion that is mapped to a cache lookup key that matches the cache lookup key of the digital component request. These matching digital components can be referred to as eligible digital components as they are eligible for display with the resource for which a digital component is being requested.

After identifying the eligible digital components, the computing systems MPC1 and MPC2 can determine which of the eligible digital components are candidates for the selection process. A digital component is a candidate when each condition for the digital component is satisfied. As described above, these conditions can be based on user group membership, frequency control, content distribution rules, and/or pacing rules.

The digital components eligible for selection can be filtered and then selected as described above with respect to FIG. 2 and process 200. The selected digital components that are then to be provided in the response to application 112 are used in step 2 by the MPC cluster 130.

For each cached digital component, the MPC cluster 130 calculates whether the application 112 belongs to an experiment group for the digital component, which receives a treatment whose effect is to be analyzed, or whether the application 112 belongs to the control group for the digital component, which does not receive the treatment. An experiment group, or treatment group, receives a digital component having a particular feature, enhancement, interactive element, color, shape, size, font, sound, video, among other features, the effect of which a digital content provider or analysis system is interested in quantifying when provided to users of a network, such as the Internet. These groups can be different for different digital components, and the MPC cluster 130 uses the peid to consistently determine whether the user should be part of the control group or the experiment group, and if a digital component is a candidate to be provided to the user and application according to whether the user/application belongs to the experiment group. The application 112 is assigned to a group as a proxy for the user.

In order to quantify the impact of a particular digital component or change to a digital component on a user, each digital component and corresponding selection criterion cached in the MPC cluster 130 may be associated with, e.g., mapped to, one of four non-negative numbers, p, k, r, and s according to the design of the experiment. For example, the system can apply the concept of mutually orthogonal Latin squares to ensure that independent variables are truly independent with no hidden confounding correlations. For example, in statistical design for experiments, the allocation of experiment treatments is such that each treatment occurs exactly once in each row and each column, such that experimental error from two sources can be identified using these squares. The non-negative numbers p, k, r, and s represent different parameters of the experimental design.

Here, p is a prime number that represents the number of modulos (mods) in each layer of the experiment (where each layer is represented by a Latin square), and the number of rows/columns in the Latin square; k is the layer identifier chosen to run the experiment where $k \in [0, p-1]$; and $0 \le r \le s \le p-1$. In other words, [r, s] defines a non-empty interval within [0, p-1], which specifies the mods in the layer specified by k in which the experiment will be conducted. In this particular example, let $c = \text{peid} \bmod(p^2)$, $x = c \bmod p$, $y = c \text{ div } p$, and $m = (k \times x + y) \bmod p$.

Conceptually, the MPC cluster 130 determines whether the cached digital component and its selection criterion is eligible for selection by determining whether $m \in [r, s]$. In other words, the MPC cluster 130 determines whether the cached digital component is a candidate for selection by determining whether $r \le (k \times x + y) \bmod p \le s$. Otherwise, the cached digital component is not a candidate and is therefore ineligible for selection. In some implementations, the digital component has to also satisfy all conditions associated with the digital component in order to be a candidate for selection, as described below.

For example, the MPC cluster 130 can calculate whether the application 112 belongs to an experiment group by determining whether $m \in [r, s]$, in other words, whether $r \le (k \times x + y) \bmod p \le s$. The MPC cluster 130 can calculate whether the application 112 belongs to the control group by determining whether $m \in [\hat{r}, \hat{s}]$, in other words, whether $\hat{r} \le (k \times x + y) \bmod p \le \hat{s}$.

In addition, each cached digital component (and corresponding selection criterion) is associated with one or more globally unique experiment identifiers, $eid_{experiment}$. To enforce global uniqueness, the MPC cluster 130 can calculate this identifier as $eid_{experiment} = \text{HMAC}(\text{owner\_domain}, \text{domain\_specific\_experiment\_id})$ which is associated with $m \in [r, s]$. Here, HMAC, or hash-based message authentication code is an example cryptographic hash function that can be used to simultaneously verify both the data integrity and the authenticity of a message, and allows the message to be uniquely hashed. Here, globally unique means that each experiment identifier $eid_{experiment}$ is unique across different domains accessible by application 112. For example, the same experiment identifier can be used across different websites and domains visited by a user of an application 112 and does not overlap with any other identifiers or users, regardless of domain.

Furthermore, each cached digital component (and corresponding selection criterion) is associated with one or more globally unique control identifiers, $eid_{control}$. To enforce global uniqueness, the MPC cluster 130 may calculate this identifier as $eid_{control} = \text{HMAC}(\text{owner\_domain}, \text{domain\_specific\_control\_id})$, which is associated with $m \in [\hat{r}, \hat{s}]$. Here, globally unique means that each control identifier $eid_{control}$ is unique across different domains accessible by application 112. For example, the same control identifier can be used across different websites and domains visited by a user of a browser 112 and does not overlap with any other identifiers or users, regardless of domain. The control identifier is associated with an interval $[\hat{r}, \hat{s}]$ that is separate from and does not overlap with [r, s], and the application is in the control group if $m \in [\hat{r}, \hat{s}]$. In other words, the MPC cluster 130 determines whether the browser is in the control group by determining whether $\hat{r} \le (k \times x + y) \bmod p \le \hat{s}$.

As an example, the list of experiment identifiers attached to a particular digital component response that is sent from the MPC cluster 130 to the client device 110 can contain $O(10^4)$ peids, one for each experiment being conducted, where each experiment represents a different digital component. The number of experiment identifiers attached varies for each request for a digital component. In some implementations, the list of peids can be large, and in order to represent the list of peids concisely to reduce bandwidth required, the system can use probabilistic data structures such as cuckoo filters or Bloom filters.

In step 2 of process 300, the MPC cluster 130 constructs a Bloom filter with the applicable experiment identifiers activated. For example, using 11 hash functions, the MPC cluster 130 can construct an optimal Bloom filter size of 2 bytes per peids with a 0.045% False Positive Rate (FPR). Each Bloom filter has a bit array, and in order to construct the Bloom filter, elements are inserted into the Bloom filter one by one. For each element, the hash functions are used to infer the bits in the bit array that correspond to the element. For example, if there are 11 hash functions, then the 11 hash functions are used to set 11 bits in the bit array to a value of 1 for the element. To prevent potentially compromised applications from extracting or falsifying confidential information out of the list of peids, the MPC cluster 130 may rely on cryptographic algorithms.

The MPC cluster 130 uses a Bloom filter because it can precisely represent the experiment identifiers activated using a small amount of data, and can be communicated with minimum bandwidth consumption. The MPC cluster 130 can control the FPR of the Bloom filter such that the impact on the statistical result of the experiments is negligible. The construction of the Bloom filter is performed using secret shares to preserve user privacy, such that each server can calculate an identifier's location within the Bloom filter, but does not know if the value is 0 or 1. The calculation can be done, for example, using a=+operation, which can be performed in secret shares. In some implementations, the Bloom filter is constructed to be a counting Bloom filter, which allows the construction to be done in secret shares, and can later be converted to a regular Bloom filter. The construction of the Bloom filter is described in further detail below with respect to steps 2-3 of process 400.

In step 3 of process 300, the MPC cluster 130 can encrypt and/or sign the Bloom filter, which can be divided into secret shares, in order to prevent any party for whom the secret share was meant from accessing the Bloom filter parameters and reconstructing the full Bloom filter. For example, the MPC cluster 130 can encrypt the Bloom filter using public key encryption.

In step 4 of process 300, once the MPC cluster 130 has determined whether the application 112 belongs to an experiment group or to the control group, the MPC cluster 130 attaches the respective experiment identifiers to the digital component response returned to the application 112. For example, the MPC cluster 130 can include the Bloom filter with the digital component response provided to the application 112. Additionally, the MPC cluster 130 selects a winning digital component from a set of candidates that satisfies all of its conditions, as described below with respect to steps 504-506 of FIG. 5.

In step 5 of the process 300, after the winning digital component has been selected from among the eligible digital components indicated by the Bloom filter according to a selection process such as the process described above with respect to FIG. 2, the application 112 renders the digital component associated with the winning selection criterion. For example, the application 112 can render a video associated with the winning selection criterion.

In step 6 of the process 300, the rendered digital component, in association with the application 112, sends a report to the DSP 150 through an aggregate measurement function, such as an aggregate measurement API native to application 112. For example, the aggregate measurement API can be integral to application 112. In some implementations, the aggregate measurement API includes a server, which can be implemented as a secure MPC cluster. The report can contain the list of peids associated with the report. For example, the report can include the previously constructed Bloom filter as well as measurements associated with the rendering of the digital component, such as the amount of time that the digital component is shown, whether a user's attention is focused on the digital component, whether other applications are running, and whether the digital component is visible, among other measurements.

In step 7 of the process 300, after accumulating a threshold number of reports, the DSP 150 uploads the received reports in secret shares to the aggregate reporting server 180. For example, the DSP 150 can periodically upload a number of encrypted reports in secret shares to the aggregate reporting server 180 such that the DSP 150 does not have access to the cleartext of the reports. The DSP 150 can detect whether a threshold number of reports have been accumulated and upload the reports in batches (i.e. secret shares) reports to the aggregate reporting server 180.

In step 8 of process 300, DSP 150 queries the aggregate reporting server 180 to obtain metrics associated with each peid. For example, DSP 150 can provide a request for various analytics, measurements, and other parameters from aggregate reporting server 180.

With respect to FIG. 4, process 400 is an example process for issuing and implementing a privacy-preserving cross-domain experimental group partitioning and monitoring mechanism to support incrementality in experiments. Many of the steps as displayed with respect to FIG. 4 and process 400 are similar to those described above with respect to FIG. 3 and process 300.

In step 1 of process 400, application 112 sends a request for a digital component to the MPC cluster 130, similar to step 1 of process 300 as described above with respect to FIG. 3.

In some cases, content providers, designers, and researchers, among other entities, would like to quantify the incremental effect attributed to a particular feature or change. For example, compared to not seeing a particular digital component, after seeing a digital component, a user is 50% more likely to RSVP "yes" to see a particular orchestra's virtual performance. To support such a study in incrementality, the system introduces a counterfactual selection process to the baseline process as described above with respect to FIGS. 2 and 3 as follows.

Similar to the baseline experiment design, the cached selection criterion is associated with p, k, r, s, $\hat{r}$, $\hat{s}$, where the MPC cluster 130 calculates the mod m from peid, p and k.

Here, if m∈[r, s], then the user is in the exposed group. In other words, the exposed group is exposed to the digital component associated with the cached selection criterion. The exposed group is associated with an experiment identifier $eid_{exposed}$. In order to ensure uniqueness, $eid_{exposed}$ is defined as $eid_{exposed}$=HMAC(owner_domain, domain_specific_exposed_id).

If m∈[$\hat{r}$, $\hat{s}$], the user is in the holdback group, which is not exposed to the digital component associated with the cached selection criterion. In other words, the treatment is "held back" from the group. The holdback group is associated with an experiment identifier $eid_{holdback}$. In order to ensure uniqueness, $eid_{holdback}$ is defined as $eid_{holdback}$=HMAC(owner_domain, domain_specific_holdback_id).

Here, if m is not within either range, then the application 112 is in neither the exposed nor the holdback group.

In step 2 of process 400, the MPC cluster 130 performs a selection process that applies all rules of the selection to select at most one of the cached digital components as the winner of the selection process. If the winning digital component is associated with an original experiment eligibility rule, the MPC cluster 130 will insert a $eid_{exposed}$ and associated metadata into the response to the request for the digital component.

In step 3 of process 400, the MPC cluster 130 then performs a counterfactual selection process that applies all rules of the selection process, with the exception of updating the experiment eligibility rule from m∈[r, s] to m∈[$\hat{r}$, $\hat{s}$]. The MPC cluster 130 can then determine a phantom candidate selection criterion based on the updated eligibility rule, selecting at most one of the cached digital components, and representing the winner of a counterfactual selection process that is exactly identical to the actual selection process, but for the update to the eligibility rule. If the winning digital component is associated with a modified experiment eligibility rule, or in other words, if the winning digital component was only eligible to be selected based on the updated eligibility rule, then the MPC cluster 130 will insert a $eid_{holdback}$ and associated metadata into the response to the request for the digital component.

The counterfactual selection process can be performed in parallel with the privacy-preserving selection process. This phantom candidate digital component eligible to win the selection process if the selection criterion for the candidate digital component satisfies the original eligibility rules, but those rules have been updated for the counterfactual selection process, and therefore have not been applied to the selection criterion. This phantom candidate digital component can be selected as the winning digital component instead of an actual candidate selection criterion depending on the value of m.

The MPC cluster 130 can conduct both of the selection processes in parallel in, for example, a batch mode without increasing the number of RPCs between the computing systems MPC1 and MPC2. The result of the counterfactual selection process allows the MPC cluster 130 to identify digital components that may not have been eligible under the original eligibility rules.

The counterfactual selection process can have the same form as the actual selection process, and in order for the digital component to be eligible for the selection process, the digital component must meet certain distribution requirements. The counterfactual selection process measures what would have happened when the eligibility rules are updated by applying all of the distribution rules that the actual selection process applies with the exception of the original eligibility rules.

The counterfactual selection process allows the system to determine whether a particular digital component would have been eligible to be distributed if it had been part of a different group in the experiment.

The example processes 300 and 400 are described above without many of the details of the MPC process(es) performed by the MPC cluster 130 to determine the eligibility of digital components for experiment groups, to select winning digital components, and including the experiment group identifiers in the responses to the digital component requests. The following section provides additional implementation details that can be used on the example processes 300 and 400.

The computers MPC1 and MPC2 of the MPC cluster 130 can perform a secure MPC process using secret shares to determine the various parameters for assigning users to experiment groups. For each selection criterion and each digital component request, the MPC cluster 130 performs each of the functions $c = peid \mod (p^2)$; $x = c \mod p$; $y = c \div p$; and $m = (k \times x + y) \mod p$. In order to protect user privacy, peid is transmitted from the client device 110 using secret shares, and each server of the MPC cluster 130 separately receives one secret share of peid. Other input parameters, such as $p, k, r, s, \hat{r}, \hat{s}$ are not sensitive information, and thus can be shared between MPC1 and MPC2 in cleartext. In some implementations, other input parameters are also processed in secret shares.

In a digital component request, MPC1 and MPC2 receive additive secret shares of peid in $Z_q$, which represents a set of arbitrarily large integers in $[0, q-1]$. In other words, MPC1 and MPC2 receive $[peid_1]$ and $[peid_2]$, respectively. Here, q is in $O(2^{128})$ and p is in $O(10,000)$. In other words, $q \gg p$. For example, q can be a large prime number, where additive secret shares in $Z_q$ have values randomly chosen from $[0, q-1]$.

Each of the MPC servers MPC1 and MPC2 separately and locally executes a series of functions using its respective secret share of the data to be kept private. For example, MPC1 locally calculates $[c_1] = [peid_1] \mod (p^2)$; $[x_1] = [c_1] \mod p$; $[y_1] = [c_1] \div p$; and $[m_1] = (k \times [x_1] + [y_1]) \mod p$.

Similarly, MPC2 locally calculates $[c_2] = [peid_2] \mod (p^2)$; $[x_2] = [c_2] \mod p$; $[y_2] = [c_2] \div p$; and $[m_2] = (k \times [x_2] + [y_2]) \mod p$. As mentioned above, brackets designate secret shares of parameters.

Due to the structure of the secure MPC cluster 130, $[x_1]$ and $[x_2]$ are additive secret shares of x in $Z_p$, $[y_1]$ and $[y_2]$ are additive secret shares of y in $Z_p$, and $[m_1]$ and $[m_2]$ are additive secret shares of m in $Z_p$.

For each cached digital component and its selection criterion sc, MPC1 and MPC2 can then collaboratively execute secret shares comparison algorithms to determine whether a particular experiment identifier is in the exposed group or the holdback group. For example, MPC1 and MPC2 can collaboratively execute secret shares comparison algorithms to evaluate is_in_exposed_group$_{sc}$=m≥r AND m≤s and is_in_holdback_group$_{sc}$=m≥ $\hat{r}$ AND m≤$\hat{s}$. The comparison algorithm can be performed using MPC protocols, and the result can be, for example, additive secret shares in $Z_2$, which represents secret shares having an integer value in $[0, 2-1]$ (i.e., a value of either 0 or 1). For example, an additive secret share in $Z_2$ means that each additive secret share value is either 0 and 1. Two such secret shares can represent a secret message of Boolean type. If the two additive secret shares are equal, the corresponding secret message is false. Otherwise the corresponding secret message is true.

In some implementations, MPC1 calculates $$[\text{is\_in\_exposed\_group}_{r,1}] = 1 - ([m_1] < r)$$
$$[\text{is\_in\_exposed\_group}_{s,1}] = 1 - ([m_1] > s)$$

-continued
$$[\text{is\_in\_holdback\_group}_{r,1}] = 1 - ([m_1] < \hat{r})$$
$$[\text{is\_in\_holdback\_group}_{s,1}] = 1 - ([m_1] > \hat{s})$$

Similarly, MPC2 calculates $$[\text{is\_in\_exposed\_group}_{r,2}] = 1 - ([m_2] < r)$$
$$[\text{is\_in\_exposed\_group}_{s,2}] = 1 - ([m_2] > s)$$
$$[\text{is\_in\_holdback\_group}_{r,2}] = 1 - ([m_2] < \hat{r})$$
$$[\text{is\_in\_holdback\_group}_{s,2}] = 1 - ([m_2] > \hat{s})$$

For each cached digital component evaluated for selection eligibility, there are x positive conditions, represented as a set of secret messages in $Z_2$. For example, these positive conditions can be represented as $\{[\text{condition}_{positive,1}], \ldots [\text{condition}_{positive,x}]\}$. These conditions can be related to user group membership, frequency control, content distribution rules, and pacing rules. Each one of these conditions must be true (represented, for example, with a value of 1) in order for the cached digital component to be eligible for the selection process. In other words, all of the x positive conditions must be satisfied in order for the cached digital component to be a candidate for selection by the MPC cluster 130.

There are y negative conditions, which are represented as a set of secret messages in $Z_2$. For example, these negative conditions can be represented as $\{[\text{condition}_{negative,1}], \ldots [\text{condition}_{negative,y}]\}$. At least one of the y conditions must be false (represented, for example, with a value of 0) in order for the cached digital component to be a candidate for selection by the MPC cluster 130.

Examples of positive conditions include membership in a particular user group, value and pacing constraints, and privacy-preserving rules. For example, the distribution of content can be controlled by input from the digital component providers 160 through value and pacing control techniques. A digital component provider can specify a total threshold value over a period of time for the selection values to implement measures to ensure that resources for a campaign that includes the digital component are not exhausted early in a campaign period. For example, a digital component provider 160 can specify that the total of selection values for selected digital components from the digital component provider 160 or for a particular digital component over the course of a week is limited to a maximum value of 8000 units. Once the maximum total of selection values is reached, the particular digital component for which the maximum is imposed will no longer be eligible for a selection process to be distributed to a client device 110 until the period of time, e.g., the week, is over.

A digital component provider can also specify a velocity, or a pace, at which a threshold value of selection values for selected digital components from the digital component provider 160 for a particular digital component is being reached. For example, a digital component provider 160 can specify that a maximum threshold value of 6000 units must be reached at a pace of less than 250 units per day over the course of a month. Once the daily total of selection values is reached, digital components provided by the digital component provider 160 for which the pacing is imposed will no longer be eligible for a selection process to be distributed to a client device 110 until the period of time, the day, is over.

In addition to enforcing digital component eligibility according to content distribution rules, the privacy-preserving selection process protects a user's privacy and improves user experience by preserving the k-anonymity of the user such that any components that are selected are provided to at least k other users. By ensuring that a particular digital component is provided to a threshold number of other users, the system prevents a form of user targeting, known as microtargeting, which narrowly targets users to an extent that some users may not feel comfortable with. For example, a digital component that is targeted at, and distributed to, only a few users may feel too personalized, and a user may feel singled out or uncomfortable with the specificity of the digital component. The privacy-preserving selection process ensures that digital components are distributed to a sufficiently broad audience such that a user feels comfortable with the digital components they receive and with the size of the digital component's target audience.

Examples of negative conditions include user preferences regarding the reduction or elimination of content or digital components from being presented to them. For example, users generally prefer to not be continually shown the same third party content as they navigate across multiple different websites, such that continually distributing the same third-party content to the same user across multiple different websites in a short period of time results in wasted computing resources that are used to distribute content that the user does not want to see, and will likely ignore. One way to limit the number of times a particular user is exposed to the same third-party content is to utilize frequency control techniques that prevent the same user from being exposed to the same third-party content more than a specified number of times in a short period of time, e.g., any consecutive 5 minutes 10 minutes, or another appropriate time period.

The system allows for further user input by receiving information from the user to mute a digital component, or prevent a digital component from being presented to them for a period of time. For example, a user can choose to mute a particular digital component that they have been presented with for a period of five days. In some implementations, the time period can be specified by the client device 110, MPC cluster 130, DSP 150, digital content provider 160, or SSP 170, based on the type of content item and/or the type of feedback provided by the user, among other factors.

In this particular example, MPC1 holds, for a given digital component, {[condition$_{positive,1,1}$], . . . [condition$_{positive,x,1}$]} and {[condition$_{negative,1,1}$], . . . [condition$_{negative,y,1}$]}, which are secret shares of Boolean values that represent whether each condition is satisfied. For example, if the first positive condition (condition$_{positive,1}$) is satisfied, [condition$_{positive,1,1}$] would be a first secret share of a secret Boolean value of one.

Similarly, MPC2 holds {[condition$_{positive,1,2}$], . . . [condition$_{positive,x,2}$]} and {[condition$_{negative,1,2}$], . . . [condition$_{negative,y,2}$]}, which are also secret shares of the Boolean values that represent whether each condition is satisfied.

For a cached digital component, to calculate a candidate parameter is_dc_a_candidate that represents whether the cached digital component is a candidate for selection using an algorithm such as the GMW (Goldreich-Micali-Wigderson) protocol, or garbled circuits, together with Oblivious Transfer extension (OTe), MPC1 appends the secret shares of the set of positive conditions with [is_in_exposed_group$_{r,1}$] and [is_in_exposed_group$_{s,1}$]. The combined set of positive conditions are {[condition$_{positive,1,1}$], . . . [condition$_{positive,x,1}$], [is_in_exposed_group$_{r,1}$], [is_in_exposed_group$_{s,1}$]}.

Similarly, MPC2 appends the secret shares of the set of positive conditions with [is_in_exposed_group$_{r,2}$] and [is_in_exposed_group$_{s,2}$]. The combined set of positive conditions are {[condition$_{positive,1,2}$], . . . [condition$_{positive,x,2}$], [is_in_exposed_group$_{r,2}$], [is_in_exposed_group$_{s,2}$]}.

The GMW protocol, or garbled circuits, is used to determine whether all of the positive conditions for a digital component are true and whether at least one of the negative conditions for the digital component are false. If so, the digital component is a candidate for the selection process. In other implementations, Boolean operations can be performed by MPC1 and MPC2 over secret shares to determine whether all of the positive conditions are true and whether at least one of the negative conditions are false. However, the GMW protocol is more efficient and involves fewer round trip computations between MPC1 and MPC2. After the completion of the GMW protocol with OTe, MPC1 holds a first secret share [is_dc_a_candidate$_1$] of the candidate parameter for the digital component and MPC2 holds a second secret share [is_dc_a_candidate$_2$] of the candidate parameter for the same digital component. MPC1 and MPC2 can determine the secret shares of the candidate parameters for each cached digital component and any JIT digital components available for selection.

This process can use two comparison tests for each determination of whether to assign the user/application 112 to the exposed group and thus activate each experiment identifier as being part of the exposed group, based on whether m∈[r, s]. Secret share comparison processes can be computationally expensive, requiring multiple round trip operations between the servers MPC1 and MPC2 within the MPC cluster 130.

In some implementations, the protocol for determining whether to activate a particular experiment identifier can be improved or optimized. In one example, given that m, r, s∈$Z_p$ and r≤s, by defining m'=(m−r) mod p, it can be proved that m∈[r, s] if and only if m'≤ (s−r). In this simplification of the equation defining the constraints that must be satisfied, the evaluation of m'≤ (s−r) requires only one comparison test instead of the two comparison tests required as described above. This reduces the amount of bandwidth consumed between MPC1 and MPC2 and reduces the latency and computation cost in determining whether users belong in the experiment groups. As this process may be performed in real-time between the time at which a digital component is requested and a digital component is provided in response to the request, reducing latency is critical in reducing errors at the client device 110 and improving the user experience.

MPC1 and MPC2 can engage in secret share comparison test algorithms using this improvement. Upon completing the comparison, MPC1 holds [is_in_exposed_group$_1$]= (([m$_1$]−r) mod p)≤ (s−r). Similarly, MPC2 holds [is_in_exposed_group$_2$]=(([m$_2$]−r) mod p)≤ (s−r). That is, each MPC server holds, for each digital component, a secret share of an exposed parameter is_in_exposed_group that represents whether the user is in the exposed group for the digital component.

The combined set of positive conditions held by MPC1 are thus {[condition$_{positive,1,1}$], . . . [condition$_{positive,x,1}$], [is_in_exposed_group$_1$]}. The combined set of positive conditions held by MPC2 are thus {[condition$_{positive,1,2}$], . . . [condition$_{positive,x,2}$], [is_in_exposed_group$_2$]}.

Using these conditions, the MPC cluster 130 can then proceed with performing the GMW algorithm using OTe.

This improvement reduces the number of comparison tests required by half and reduces the number of rows in a truth table constructed for the GMW protocol by half, without increasing the number of round trip operations required between the servers in the MPC cluster 130.

For each digital component request, each digital component (and its corresponding selection criterion) may be associated with an experiment identifier, $eid_{experiment}$, which is activated if is_in_exposed_group is true or $eid_{control}$, which is activated if is_in_holdback_group is true. These parameters can vary per digital component based on whether the user for which the request is generated should be assigned to the experiment group for the digital component.

To return variable number of eids to the application 112 and later to the aggregate reporting server 180, as described in step 4 of FIGS. 3 and 4, the system can leverage Bloom filters to reduce the bandwidth and storage cost.

For example, if the expected number of eids to be activated for a digital component request is N, for a desired FPR, the MPC cluster 130 can compute an optimal or target number of hash functions F and number of bits B per peid for the Bloom filter.

Next, MPC1 and MPC2 can create a counting Bloom filter R of size N× B, where the value of each element is in [0, number_of_cached_digital_components]. Here, R=reconstruct ($R_1$, $R_2$), and MPC1 and MPC2 can create arrays $R_1$ and $R_2$ respectively. Both arrays are of N×B size, containing N×B additive secret shares in $Z_p$. Each array is initialized to 0.

In order to minimize the bandwidth consumption, MPC1 and MPC2 execute the following cryptographic protocol to construct the counting Bloom filter R, then convert R into a normal bloom filter, where each element is an additive secret share in $Z_2$.

For $eid_{experiment}$, for each of the hash functions $\{f_1, \ldots, f_F\}$, $f_i(eid_{experiment}) \in [0, N \times B - 1]$ holds true. For each of the hash functions $f_i \in \{f_1, \ldots, f_F\}$, MPC1 increments array $R_1[f_i(eid_{experiment})]$ by [is_in_exposed_group$_1$]. For example, MPC1 performs the operation $R_1[f_i(eid_{experiment})]$+=[is_in_exposed_group$_1$].

Similarly MPC2 increments array $R_2[f_i(eid_{experiment})]$ by [is_in_exposed_group$_2$]. For example, MPC2 performs the operation $R_2[f_i(eid_{experiment})]$+=[is_in_exposed_group$_2$].

To insert $eid_{control}$ into the same Bloom filter, for each of the hash functions $f_i \in \{f_1, \ldots f_F\}$, MPC1 increments array $R_1[f_i(eid_{control})]$ by [is_in_holdback_group$_1$]. For example, MPC1 performs the operation $R_1[f_i(eid_{control})]$+=[is_in_holdback_group$_1$].

Similarly MPC2 increments array $R_2[f_i(eid_{control})]$ by [is_in_holdback_group$_2$]. For example, MPC2 performs the operation $R_2[f_i(eid_{control})]$+=[is_in_holdback_group$_2$].

Additionally, MPC2 selects a pseudorandom function (PRF) in advance, where PRF:Z×Z→{0, 1}. In addition, MPC2 selects a nonce for the digital component response. Here, $R_2$ represents MPC2's resultant Bloom filter in $Z_2$:$R_2'$[i]=PRF (nonce, i). In some implementations, these steps are performed by MPC1 rather than MPC2.

Next, MPC2 constructs a garbled circuit of AND gates to construct the function ceil(log$_2$(number_of_cached_bids)+1), enabling MPC1 to calculate its resultant array of secret shares $R_1'$[i] such that $R_1'$[i] and $R_2'$[i] are two additive secret shares in $Z_2$ of secret Boolean message R[i]>0. This garbled circuit calculation requires one round trip calculation between MPC1 and MPC2.

In step 4, the MPC cluster 130 returns a digital component response to the application 112. The response includes either the $eid_{control}$, which was associated with the winning, selected digital component of the actual selection process, the $eid_{holdback}$, which was associated with the winning, selected digital component of the counterfactual selection process, or neither experiment identifier, dependent on the value of m determined above.

MPC1 and MPC2 then return $R_1'$ and nonce respectively to the application 112 as part of the digital component response. If MPC1 receives the original digital component request from the application 112, and MPC2 needs to return its result to the browser via MPC1, MPC2 may digitally sign and then encrypt its result and return PublicKeyEncrypt (Sign(nonce, MPC2_private_key), browser_public_key) to the browser via MPC1 in order to prevent MPC1 from eavesdropping or falsifying MPC2's result. In some implementations, MPC1 may also encrypt and then digitally sign its result.

In step 5 of process 400, application 112 accumulates peids for either the exposed group or holdback group and associated metadata in local storage. For example, application 112 accumulates experiment identifiers in its cache. An application can be associated with the exposed group for some experiments and with the holdback group for other experiments.

In step 6 of process 400, the rendered digital component, in association with the application 112, sends a report to the DSP 150 through an aggregate measurement function, such as an aggregate measurement API native to application 112. The report can contain the list of peids associated with the report. For example, the report can include the previously constructed Bloom filter as well as measurements associated with the rendering of the digital component, such as the amount of time that the digital component is shown, whether a user's attention is focused on the digital component, whether other applications are running, and whether the digital component is visible, among other measurements.

In step 7 of the process 400, after accumulating a threshold number of reports, the DSP 150 uploads the received reports in secret shares to the aggregate reporting server 180. For example, the DSP 150 can periodically upload a number of encrypted reports in secret shares to the aggregate reporting server 180 such that the DSP 150 does not have access to the cleartext of the reports. The DSP 150 can detect whether a threshold number of reports have been accumulated and upload the reports in batches (i.e. secret shares) reports to the aggregate reporting server 180.

In step 8 of process 400, DSP 150 queries the aggregate reporting server 180 to obtain metrics associated with each peid. For example, DSP 150 can provide a request for various analytics, measurements, and other parameters from aggregate reporting server 180.

Figure 5:
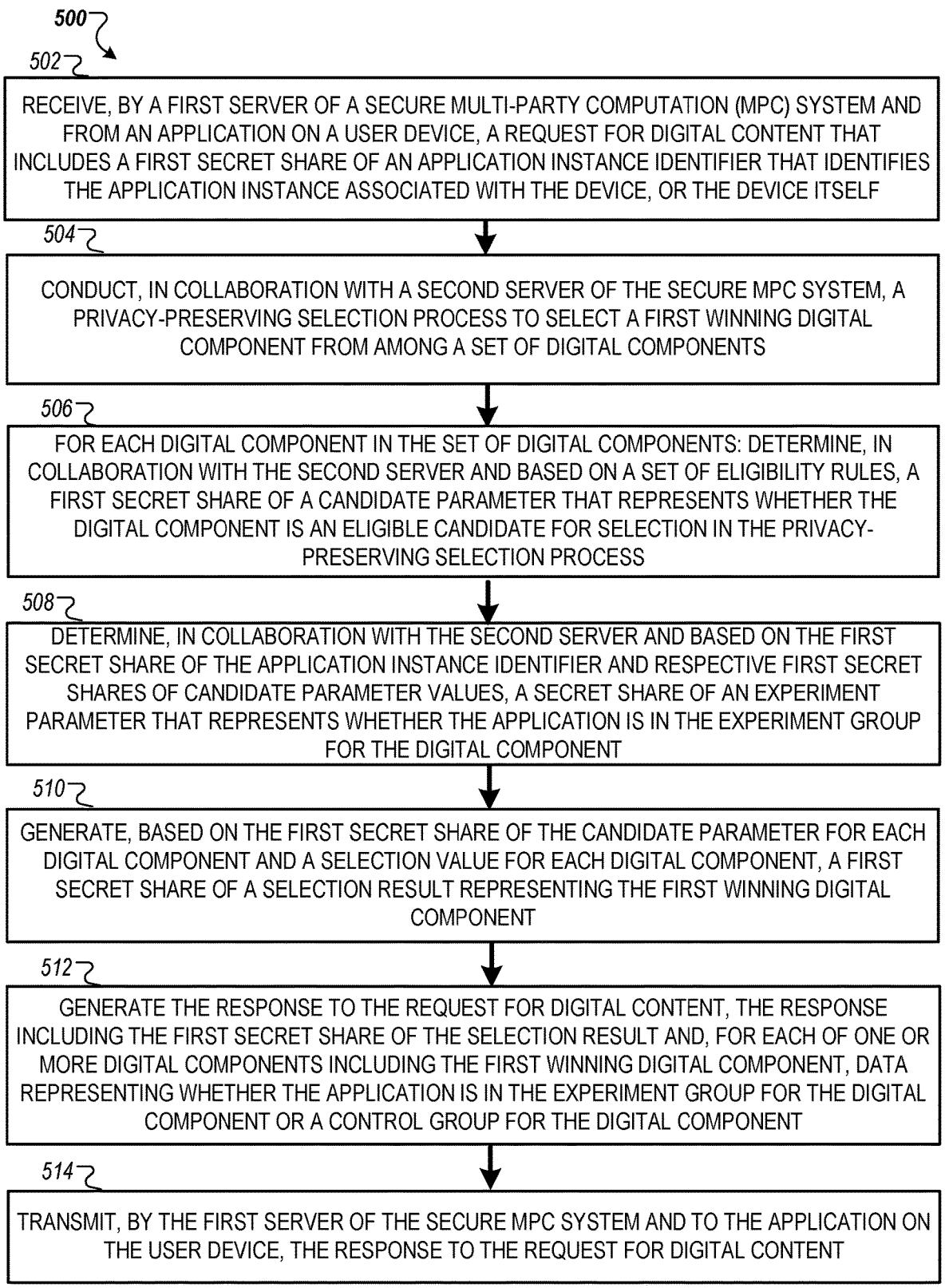
FIG. 5 is a flow diagram that illustrates an example process for issuing and implementing a privacy-preserving cross-domain experimental group partitioning and monitoring mechanism.

FIG. 5 is a flow diagram that illustrates an example process 500 for issuing and implementing a privacy-preserving experiment monitoring mechanism. Operations of the process 500 can be implemented, for example, by application 112, MPC cluster 130, DSPs 150, and/or aggregation reporting server 180. Operations of the process 500 can also be implemented as instructions stored on one or more computer readable media which may be non-transitory, and execution of the instructions by one or more data processing apparatus can cause the one or more data processing apparatus to perform the operations of the process 500.

Process 500 begins with receiving, by a first server of a secure multi-party computation (MPC) system and from an application on a user device, a request for digital content, wherein the request comprises a first secret share of an application instance identifier that identifies the application instance associated with the device, or the device itself (502). For example, MPC cluster 130 can receive a request for digital content as described above with reference to step A of FIG. 2 and step 1 of FIGS. 3-4. The application instance identifier identifies an instance of an application (e.g., a session of Example News Application) that is running on a particular device, or identifies the device itself.

Process 500 continues with, in response to receiving the request and by the first server of the secure MPC system, conducting, in collaboration with a second server of the secure MPC system, a privacy-preserving selection process to select a first winning digital component from among a set of digital components, wherein each digital component has a corresponding (i) unique experiment identifier and (ii) unique control identifier (504). The set of digital components can include cached digital components having a cache lookup key that matches a lookup key included with the request. That is, the set of digital components can be the cached digital components for which the contextual signals defined by the lookup key of the request matches contextual signals defined by the cache lookup key of the digital component. The first MPC system can compare the lookup key of the request to the cache lookup keys of the cached digital components.

The conducting includes, for each digital component in the set of digital components, determining, in collaboration with the second server and based on a set of eligibility rules, a first secret share of a candidate parameter that represents whether the digital component is an eligible candidate for selection in the privacy-preserving selection process (506).

For example, the selection process includes determining whether a digital component is a candidate for selection based on a set of eligibility rules. The result of this candidate determination process is that each of MPC1 and MPC2 is holding a share of the candidate parameter is_dc_a_candidate for each digital component in the set of digital components, indicating whether the digital component is a candidate for selection, for each digital component. In this way, the computers of the MPC cluster 130 do not hold the actual eligibility of candidates or list of candidates in cleartext. In some implementations, each of the two servers can cache the candidates (which are not privacy sensitive) in cleartext.

In some implementations, some part of the cached candidates may be sensitive information, and therefore neither one of the two servers can hold the candidates in cleartext. In such cases, the sensitive information of the cached digital component can be held in secret shares.

Similar to the process 200 described above with respect to FIG. 2, for each condition of each conditional digital component (e.g., digital components that have at least one condition), each computing system MPC1 and MPC2 can store a corresponding secret share of the parameter for each condition for the digital component. In this way, as long as at least one MPC computing system is honest, neither computing system MPC1 nor MPC2 knows the value of the parameter in cleartext. Each digital component can be conditioned on zero or more of the conditions. For a given digital component selection process, some digital components can have different conditions and/or different quantities of conditions than other digital components.

Although some example conditions are provided above, other conditions can also be used. In general, the computing systems MPC1 and MPC2 can calculate the secret shares of the condition parameters using a secure MPC process. The criteria and techniques for determining the condition parameters can vary. In some implementations, the secret shares of the condition parameters can be received from another computing system, e.g., such that the computing systems MPC1 and MPC2 do not compute the condition parameters.

The computing systems MPC1 and MPC2 can determine whether a conditional digital component is a candidate for the digital component selection process using the secret shares of the condition parameters. The computing systems MPC1 and MPC2 can calculate secret shares of a candidate parameter is_dc_a_candidate$_i$ for each conditional digital component i using the secret shares of the condition parameter(s) for the conditional digital component. In general, if a conditional digital component is conditioned on each of the conditions described above, the candidate parameter for digital component i can be calculated by determining, for example, whether all of the positive conditions are true, e.g., one in some implementations or non-zero in other implementations, and whether at least one negative condition is false, e.g., zero, as described above with respect to steps 2 and 3 of process 400 in FIG. 4.

As the value of each condition parameter is in secret shares, the computing systems MPC1 and MPC2 can collaborate in a secure MPC process using round trip Remote Procedure Calls (RPCs) to determine corresponding secret shares [is_dc_a_candidate$_{i,1}$] and [is_dc_a_candidate$_{i,2}$] of the candidate parameter for digital component i using the secret shares of the condition parameters. Any appropriate secret sharing algorithm for determining logical AND operations can be used to determine the secret shares [is_dc_a_candidate$_{i,1}$] and [is_dc_a_candidate$_{i,2}$] of the candidate parameter for digital component i. For example, as described above, the GMW protocol, or garbled circuits, can be used. The computing systems MPC1 and MPC2 can determine the secret shares of the candidate parameter using only the secret shares of the condition parameters for those conditions. As the end of this secure MPC process, computing system MPC1 holds the first secret share [is_dc_a_candidate$_{i,1}$] of the candidate parameter for the i-th conditional digital component and computing system MPC2 holds the second secret share [is_dc_a_candidate$_{i,2}$] of the candidate parameter for the i-th conditional digital component.

In some implementations, the computing systems MPC1 and MPC2 evaluate the conditions for each digital component using a garbled circuits protocol. In this example, one of the computing systems MPC1 or MPC2 can construct the garbled circuit. For this example, assume that computing system MPC1 constructs the garbled circuit. Computing system MPC1 knows its own secret shares and also knows that there is only one possible bit pattern that computing system MPC2's secret shares must hold in order for the candidate parameter for the digital component to become true, or one.

The computing system MPC1 determines an order of the digital components based on the selection criteria, which can be a cleartext value, associated with each digital component. Similarly, the computing system MPC2 determines an order of the digital components based on the selection criteria. The selection criteria can also be referred to as selection values. These two orders should be exactly the same because the input to the ordering process is the same on the two computing systems MPC1 and MPC2. Each computing system MPC1 and MPC2 can determine an order of the digital components. Each order can include candidate digital components that were evaluated for candidate eligibility previously and other digital components. The order can be from the digital component having the highest selection value to the digital component having the lowest selection value. In some implementations, the selection values used for the order can be the value that would be provided to the publisher 140 of the resource with which a selected digital component would be displayed, e.g., after any sharing with a DSP 150 and/or SSP 170, plus any applicable boost.

As the selection values are in cleartext, the computing systems MPC1 and MPC2 do not have to perform any roundtrip computations to determine the order of the digital components. Instead, each computing system MPC1 and MPC2 can order the selection values independently. If the selection values were stored as secret shares at each computing system MPC1 and MPC2, with each computing system MPC1 and MPC2 having a respective secret share of each selection value, the computing systems MPC1 and MPC2 can perform a secure MPC process using roundtrip computations to order the selection values. If there is a tie between two or more selection values, the computing systems MPC1 and MPC2 can break the tie deterministically using other metadata for the digital components corresponding to these selection values.

The computing systems MPC1 and MPC2 determine secret shares of an accumulated value for each candidate digital component. Conceptually, the accumulated value for a given digital component represents a total number of candidate digital components from the top of the order to the selection value for the given digital component, excluding the given digital component even if the given digital component is a candidate. That is, the accumulated value represents a number of candidate digital components that are more eligible for selection than the given digital component. This concept is shown in Table 1 below.

TABLE 1

| Ordered Selection Values | is_dc_a_candidate | Accumulated Value (acc) | Is Accumulated Value Equal to 0? |
|---|---|---|---|
| Highest | 0 | 0 | 1 |
| 2$^{nd}$ Highest | 1 | 0 | 1 |
| 3$^{rd}$ Highest | 0 | 1 | 0 |
| 4$^{th}$ Highest | 1 | 1 | 0 |
| ... | ... | ... | ... |

In some implementations, the accumulated value for a given digital component represents a total number of candidate digital components from the top of the order to the given digital component, including the given digital component if the given digital component is a candidate. In this example, the fourth column would represent whether the accumulated value is equal to one rather than zero. For brevity, the remaining discussion will be in terms of the first example in which the accumulated value for a given digital component represents a total number of candidate digital components from the top of the order to the given digital component, excluding the given digital component even if the given digital component is a candidate.

Conceptually, in Table 1, the accumulated value (acc) is incremented for each digital component that has a candidate parameter is_dc_a_candidate equal to one as it progresses from the top of the order to the bottom of the order. As described below; the calculation of the accumulated values acc is performed in secret shares. For example, the accumulated value acc for the digital component having the highest selection value is zero as the candidate parameter is_dc_a_candidate for the highest selection value is equal to zero. The accumulated value acc for the second highest digital component is also zero as the candidate parameter is_dc_a_candidate for the second highest digital component is equal to one but none of the selection values above the second highest digital component has a candidate parameter is_dc_a_candidate equal to one. Moving down the order, accumulated value ace for the candidate parameter is_dc_a_candidate for the third highest selection digital component is incremented to a value of one based on the candidate parameter is_dc_a_candidate for the second highest selection value having a value of one. As the candidate parameter is_dc_a_candidate for the third highest digital component is zero, the accumulated value acc for the fourth digital component is not incremented and has a value of zero like the third highest digital component.

Using Table 1, the computing systems MPC1 and MPC2 would select, for distribution to the client device 110, the digital component corresponding to the selection value for which the overall candidate parameter is_dc_a_candidate has a value of one and the accumulated value acc has a value of zero, as indicated in the fourth column of Table 1. This represents the digital component corresponding to the highest ordered selection value for which the candidate parameter is_dc_a_candidate has a value of one. As the candidate parameter is_dc_a_candidate is in secret shares for the computing systems MPC1 and MPC2 to maintain user privacy and ensure that user data is not leaked, the computing systems MPC1 and MPC2 determine secret shares of the accumulated value acc for each digital component and use roundtrip computations to determine which digital component has an accumulated value acc that is equal to zero and a candidate parameter is_dc_a_candidate that is equal to one.

The computing systems MPC1 and MPC2 can determine their secret shares of the accumulated value acc for each digital component independently without any roundtrip computations in some implementations depending on the secret share algorithm. For example, computing system MPC1 can determine, for each digital component i, a first share $[acc_{i,1}]$ of the accumulated value acc by traversing all of the digital components in order from highest to lowest and summing the candidate parameters is_dc_a_candidate for the digital components along the way, as described above with reference to Table 3. Similarly, computing system MPC2 can determine, for each digital component i, a second share $[acc_{i,2}]$ of the accumulated value acc by traversing all of the digital components in order from highest to lowest and summing the candidate parameters is_dc_a_candidate for the digital components along the way.

The computing systems MPC1 and MPC2 determine, for each digital component, secret shares of a result that indicates whether the accumulated value has a specified value. The specified value can be a value of zero, as shown in columns 3 and 4 of Table 1. As described above, the digital component for which the accumulated value is zero and the overall candidate parameter is_dc_a_candidate is one is the digital component having the highest selection value among the candidate digital components.

The computing systems MPC1 and MPC2 can engage in multiple rounds of computations, e.g., multiple RPCs, as part of a secure MPC process to calculate the equality operation $acc_i=0$ in terms of secret shares for each digital component i. The equality operation is used to determine whether the accumulated value $acc_i$ for the digital component i has a value of zero. At the end of this process, computing system MPC1 has, for each digital component i, one secret share of the result $acc_i=0$, and computing system MPC2 has, for each digital component, the other secret share of the result $acc_i=0$.

The computing systems MPC1 and MPC2 determine secret shares of a winner parameter is_dc_the_winner$_i$ for each digital component i. The computing systems MPC1 and MPC2 can determine the winner parameters is_dc_the_winner$_i$ based on, for each digital component i, the secret shares of the accumulated value acc$_i$=0 and the secret shares of the candidate parameter is_dc_a_candidate$_i$ for each digital component i. The winner parameter is_dc_the_winner$_i$ for each digital component i can be a Boolean value that indicates whether the digital component i is the winner of the selection process, e.g., whether the digital component i is selected for distribution to the client device 110 in response to the digital component request.

In some implementations, computing system MPC1 and MPC2 can carry out secret share multiplication protocol to calculate, for each selection value, the winner parameter is_dc_the_winner$_i$=(is_dc_a_candidate$_i$×(acc$_i$=0)) in terms of secret shares. This can include one RPC between the computing systems MPC1 and MPC2 to multiple two secret shares. At the end of this MPC process, computing system MPC1 has one secret share of the result is_dc_the_winner$_i$ represented as [is_dc_the_winner$_{i,1}$]=[is_dc_a_candidate$_{i,1}$]×([acc$_{i,1}$]==1). Similarly, computing system MPC2 has the other secret share of the result is_dc_the_winner$_i$ represented as [is_dc_the_winner$_{i,2}$]=[is_dc_a_candidate$_{sv,2}$]×([acc$_{i,2}$]==0). Note that for all digital components, at most one digital component has a winner parameter is_dc_the_winner$_i$ that is equal to one, which is the digital component that is selected for distribution to the client device 110. All others would equal zero. In some implementations, computing system MPC1 and MPC2 can carry out the secret share logical operation protocol (e.g., GMW or garbled circuits) to calculate, for each selection value, the winner parameter is_dc_the_winner$_i$=(is_dc_a_candidate$_i$ AND (acc$_i$=0)) in terms of secret shares.

Process 500 continues where the conducting further includes, for each digital component in the set of digital components, determining, in collaboration with the second server and based on the first secret share of the application identifier and respective first secret shares of experiment values, a secret share of an experiment parameter that represents whether the application is in the experiment group for the application (508). For example, MPC1 of MPC cluster 130 can determine, in collaboration with MPC 2 and based on the first secret share of the application identifier, and secret shares of the experiment values as described above with respect to FIGS. 2-4, a secret share of an experiment parameter, such as eid$_{holdback}$ or eid$_{exposed}$, that indicates whether application 112 is part of the experiment group for the digital component.

Process 500 continues with generating, based on the first secret share of the candidate parameter for each digital component and a selection value for each digital component, a first secret share of a selection result representing the first winning digital component (510). For example, MPC cluster 130 can generate, based on the first secret share of the candidate parameter for each digital component and the selection criterion for each digital component, a first secret share of a selection result representing the first winning digital component. The selection result can identify the first winning digital component or include the digital component.

Process 500 continues with generating the response to the request for digital content, the response comprising the first secret share of the selection result and, for each of one or more digital components including the first winning digital component, data representing whether the application is in the experiment group for the digital component or a control group for the digital component (512). For example, MPC cluster 130 generates the response to the request for digital component, as described above with respect to FIGS. 2-4 and step 502 of process 500. The response includes data, such as eid$_{holdback}$ or eid$_{exposed}$ that represents whether the application 112 is in the experiment group for the digital component or a control group for the digital component.

Process 500 continues with transmitting, by the first server of the secure MPC system and to the application on the user device, the response to the request for digital content (514). For example, MPC1 of MPC cluster 130 transmits the response to the request for a digital component to the application 112. In some implementations, MPC1 can transmit its own first secret share and a second, encrypted secret share from MPC2 to application 112 as the response to the request for a digital component.

As mentioned above, the MPC cluster 130 can use garbled circuits for the secure MPC process used to determine whether a digital component is a candidate of a selection process, e.g., to determine the secret shares of the candidate parameter for the digital component. As there can be many conditions per digital component, e.g., over 50 in some cases, there would be many gates in the garbled circuits for each digital component. Reducing the number of gates will reduce the bandwidth cost to execute the secure MPC protocol and significantly reduce the latency in selecting a digital component.

There are a lot of repetitive calculations and logical AND computations between the same pair of input or intermediate Boolean variables, e.g., for the same digital component or for groups of digital components. A greedy algorithm can be used to avoid duplicated computation of subexpressions and therefore reduces the number of AND operations.

In the process 500 described above, it is assumed that the candidate parameter is_dc_a_candidate is in $Z_p$ with values of either zero or one. The MPC cluster 130 will iterate through all cached digital components from the digital component with the highest selection value (e.g., the portion attributed to the publisher) from highest to lowest. For each cached digital component i, the MPC cluster 130 calculates the accumulated value acc$_i$, then computes acc$_i$=0 in $Z_p$. The result is converted back to $Z_2$. The conversion from $Z_2$ to $Z_p$ and back increases the protocol complexity. The equality test acc$_i$=0 in $Z_p$ using garbled circuits can involve log 2(p) gates, which is significant performance and bandwidth cost.

The MPC cluster 130 can keep the candidate parameter is_dc_a_candidate$_i$ in Z2 and calculate the accumulated value acc; then acc$_i$=0 in $Z_2$ with Boolean circuits at much lower performance and bandwidth cost. To do this the accumulated value acc$_i$ is limited to two possible values: zero if no candidate digital component has a higher selection value than the current selection value for the current digital component i, or one if at least one candidate digital component has a higher selection value than the current selection value for the current digital component. In the process 500 of FIG. 5, the accumulated value could be greater than one as it was incremented for each candidate digital component.

With the updated semantics of the accumulated value acc, the MPC cluster 130 can calculate the accumulated value the winner parameter is_dc_the_winner$_i$ while iterating through all cached digital components, from the highest selection value to the lowest as follows. The accumulated value acc for the digital component having the highest selection value is always zero. No calculation is needed.

The accumulated value acc for the digital component having the second highest selection value is always equal to the value of the candidate parameter is_dc_a_candidate of the digital component having the highest selection value. No calculation is needed for this either.

Assume that the MPC cluster 130 has already calculated the accumulated value acc for the digital component having the n-th highest selection value. The accumulated value acc for the digital component having the (n+1)-th highest selection value can be calculated as $acc_{n+1} = acc_n$ OR is_dc_a_candidate. The MPC cluster 130 can further calculate the winner parameter is_dc_a_winner$_{n+1}$ = is_dc_a_candidate$_{n+1}$ AND NOT acc$_{n+1}$.

The MPC cluster 130 could have two gates with four wires for each cached digital component, e.g., two input wires (acc$_n$ and is_dc_a_candidate$_n$) and two output wires (acc$_{n+1}$ and is_dc_a_winner$_{n+1}$). With these enhancements, the MPC cluster 130 needs only two gates per cached digital component instead of dozens of gates each. This cryptographic process can be performed as part of one of the above steps of process 500, such as step 506. For example, the cryptographic evaluation can be performed as part of the candidate eligibility determination as described above with respect to step 506, in which all of the positive conditions must be true and at least one negative condition is false. In some implementations, conditions such as membership in a particular experiment group must be true.

Figure 6:
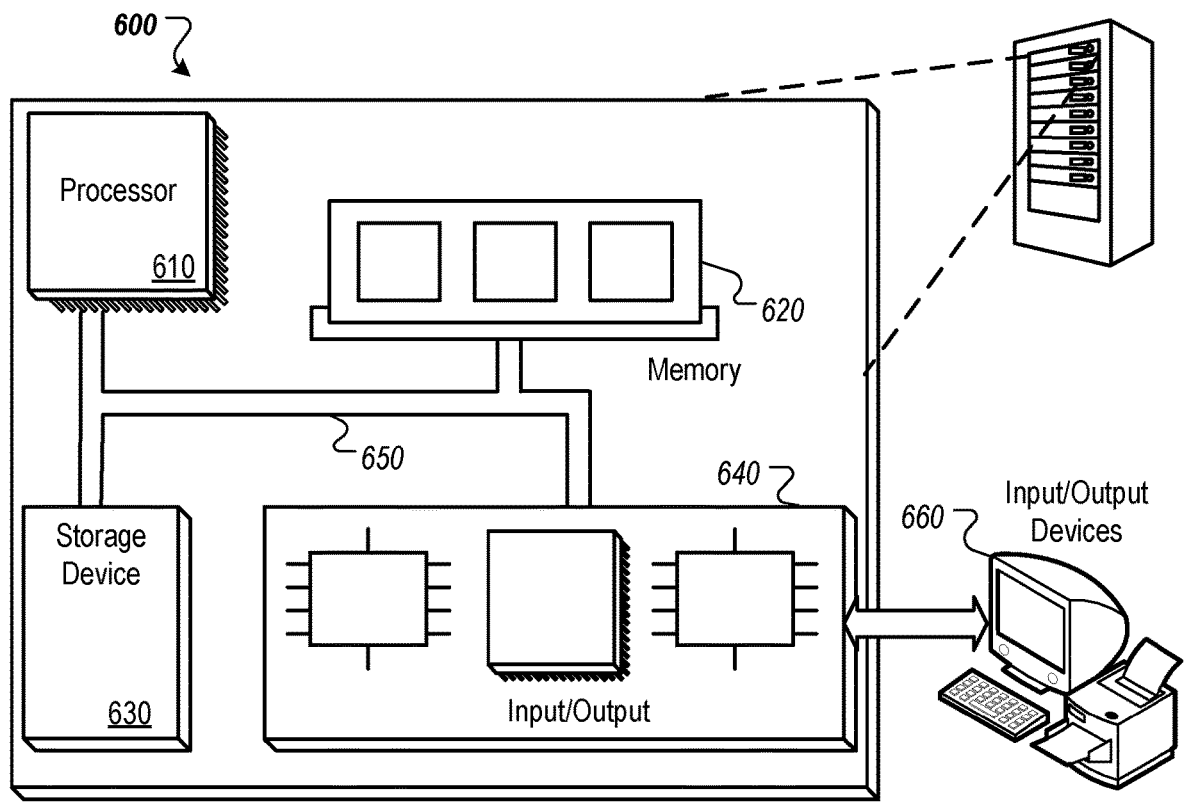
FIG. 6 is a block diagram of an example computer system.

FIG. 6 is a block diagram of an example computer system 600 that can be used to perform operations described above. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In some implementations, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In some implementations, the memory 620 is a volatile memory unit. In another implementation, the memory 620 is a non-volatile memory unit.

The storage device 630 is capable of providing mass storage for the system 600. In some implementations, the storage device 630 is a computer-readable medium. In various different implementations, the storage device 630 can include, for example, a hard disk device, an optical disk device, a storage device that is shared over a network by multiple computing devices (e.g., a cloud storage device), or some other large capacity storage device.

The input/output device 640 provides input/output operations for the system 600. In some implementations, the input/output device 640 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 660, e.g., keyboard, printer and display devices. Other implementations, however, can also be used, such as mobile computing devices, mobile communication devices, set-top box television client devices, etc.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices: magnetic disks, e.g., internal hard disks or removable disks: magneto-optical disks: and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well: for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user: for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The following is a non-exhaustive list of aspects of the present disclosure.

Aspect 1. A method for privacy-preserving cross-domain experiment monitoring, comprising: receiving, by a first server of a secure multi-party computation (MPC) system and from an application on a user device, a request for digital content, wherein the request comprises a first secret share of an application identifier that identifies the application: in response to receiving the request and by the first server of the secure MPC system: conducting, in collaboration with a second server of the secure MPC system, a privacy-preserving selection process to select a first winning digital component from among a set of digital components, wherein each digital component has a corresponding (i) unique experiment identifier and (ii) unique control identifier, the conducting comprising: for each digital component in the set of digital components: determining, in collaboration with the second server and based on a set of eligibility rules, a first secret share of a candidate parameter that represents whether the digital component is a candidate for selection in the privacy-preserving selection process: determining, in collaboration with the second server and based on the first secret share of the application identifier and respective first secret shares of candidate parameter values, a secret share of an experiment parameter that represents whether the application is in the experiment group for the digital component; generating, based on the first secret share of the candidate parameter for each digital component and a selection value for each digital component, a first secret share of a selection result representing the first selected digital component: and generating the response to the request for digital content, the response comprising the first secret share of the selection result and, for each of one or more digital components including the first selected digital component, data representing whether the application is in the experiment group for the digital component or a control group for the digital component: transmitting, by the first server of the secure MPC system and to the application on the user device, the response to the request for digital content.

Aspect 2. The method of aspect 1, wherein the data representing whether the application is in the experiment group for the digital component or a control group for the digital component is represented by a Bloom filter.

Aspect 3. The method of aspect 2, wherein conducting a privacy-preserving selection process to select a first winning digital component comprises:
for each digital component in the set of digital components:
adding, to the Bloom filter, a corresponding (i) unique experiment identifier and (ii) unique control identifier.

Aspect 4. The method of any one of aspects 1 to 3, wherein determining whether the application is part of a control group or an experiment group with respect to the first winning digital component comprises:
determining, for each experiment of a set of experiments associated with the digital component, determining whether the application is part of a control group or an experiment group with respect to the first winning digital component.

Aspect 5. The method of any one of aspects 1 to 4, wherein the set of eligibility rules includes two or more eligibility rules,
wherein one or more parameters of a first eligibility rule is determined based on an experiment design based on a number of mutually orthogonal Latin squares of a particular size, and
wherein the first eligibility rule specifies a first range of values for the one or more parameters.

Aspect 6. The method of aspect 5, further comprising:
updating, based on the experiment design, the one or more parameters of the first eligibility rule to specify a second range of values for the one or more parameters; and
conducting, by the first server of the secure MPC system and in collaboration with the second server of the secure MPC system, a counterfactual selection process to select a second winning selection criterion from among the set of selection criterion by applying the set of eligibility rules, including the updated first eligibility rule.

Aspect 7. The method of any one of aspects 1 to 6, wherein transmitting, by the first server of the secure MPC system and to the application on the user device, the response to the request for digital content comprises:
receiving, by the first server of the secure MPC system and from the second server of the secure MPC system, an encrypted secret share of the response to the request for digital content;
encrypting, by the first server of the secure MPC system, a second secret share of the response to the request for digital content to generate an encrypted second secret share of the response; and
transmitting, by the first server of the secure MPC system and to the application on the user device, the encrypted secret share of the response and the encrypted second secret share of the response.

Aspect 8. The method of any one of aspects 1 to 7, wherein the set of eligibility rules includes one or more eligibility rules,
wherein the set of eligibility rules includes at least one positive condition and at least one negative condition, and
wherein the set of selection criteria are stored at the secure MPC system.

Aspect 9. The method of any one of aspects 1 to 8, wherein attaching the unique experiment identifier associated with the selection criteria to a response to the request for digital content comprises adding the unique experiment identifier to a list of unique identifiers included with the response, and
wherein attaching the unique control identifier associated with the selection criteria to the response to the request for digital content comprises adding the unique control identifier to the list of unique identifiers, and
wherein the list of unique identifiers is represented using a Bloom filter.

Aspect 10. The method of aspect 9, further comprising:
transmitting, by the application and to a demand side platform associated with the selected digital component, a first report including the list of unique identifiers; and
uploading, by the demand side platform associated with the selected digital component to an aggregate reporting server, a batch of one or more reports that includes the first report.

Aspect 11. A system comprising:
a first server of a secure multi-party computation system, and
a second server of a secure multi-party computation system,
the system configured to perform the method of any one of aspects 1 to 10.

The invention claimed is:

1. A method for privacy-preserving cross-domain experiment monitoring, comprising:
receiving, by a first server of a secure multi-party computation (MPC) system and from an application on a user device, a request for digital content, wherein the request comprises a first secret share of an application instance identifier that identifies the application instance associated with the device, or the device itself;
in response to receiving the request and by the first server of the secure MPC system:
conducting, in collaboration with a second server of the secure MPC system, a privacy-preserving selection process to select a first winning digital component from among a set of digital components, wherein each digital component has a corresponding (i) unique experiment identifier and (ii) unique control identifier, the conducting comprising:

for each digital component in the set of digital components:

determining, in collaboration with the second server and based on a set of eligibility rules, a first secret share of a candidate parameter that represents whether the digital component is an eligible candidate for selection in the privacy-preserving selection process;

determining, in collaboration with the second server and based on the first secret share of the application instance identifier and respective first secret shares of candidate parameter values, a secret share of an experiment parameter that represents whether the application is in an experiment group for the digital component;

generating, based on the first secret share of the candidate parameter for each digital component and a selection value for each digital component, a first secret share of a selection result representing the first winning digital component; and generating a response to the request for digital content, the response comprising the first secret share of the selection result and, for each of one or more digital components including the first winning digital component, data representing whether the application is in the experiment group for the digital component or a control group for the digital component; and transmitting, by the first server of the secure MPC system and to the application on the user device, the response to the request for digital content.

2. The method of claim 1, wherein the data representing whether the application is in the experiment group for the digital component or a control group for the digital component is represented by a Bloom filter.

3. The method of claim 2, wherein conducting a privacy-preserving selection process to select a first winning digital component comprises:

for each digital component in the set of digital components:

adding, to the Bloom filter, a corresponding (i) unique experiment identifier if the application is in the experiment group, or (ii) unique control identifier if the application is in the control group.

4. The method of claim 1, wherein determining the secret share of an experiment parameter that represents whether the application is in an experiment group for the digital component comprises:

determining, for each experiment of a set of experiments associated with the digital component, whether the application is part of a control group or an experiment group with respect to each digital component.

5. The method of claim 1, wherein the set of eligibility rules includes two or more eligibility rules, wherein one or more parameters of a first eligibility rule is determined based on an experiment design based on a number of mutually orthogonal Latin squares of a particular size, and wherein the first eligibility rule specifies a first range of values for the one or more parameters.

6. The method of claim 5, further comprising:

updating, based on the experiment design, the one or more parameters of the first eligibility rule to specify a second range of values for the one or more parameters; and conducting, by the first server of the secure MPC system and in collaboration with the second server of the secure MPC system, a counterfactual selection process to select a second winning digital component from among the set of digital components by applying the set of eligibility rules, including the updated first eligibility rule.

7. The method of claim 1, wherein transmitting, by the first server of the secure MPC system and to the application on the user device, the response to the request for digital content comprises:

receiving, by the first server of the secure MPC system and from the second server of the secure MPC system, an encrypted second secret share of the selection result representing the first winning digital component; and transmitting, by the first server of the secure MPC system and to the application on the user device, the first secret share of the selection result and the encrypted second secret share of the selection result.

8. The method of claim 1, wherein the set of eligibility rules includes one or more eligibility rules, wherein the set of eligibility rules includes at least one positive condition, and wherein a set of selection criteria are stored at the secure MPC system.

9. The method of claim 8, wherein the set of eligibility rules includes at least one negative condition.

10. The method of claim 1, further comprising:

attaching the unique experiment identifier associated with the first winning digital component to the response to the request for digital content, including adding the unique experiment identifier associated with the first winning digital component to a list of unique identifiers included with the response, and attaching the unique control identifier associated with the first winning digital component to the response to the request for digital content, including adding the unique control identifier associated with the first winning digital component to the list of unique identifiers, and wherein the list of unique identifiers is represented using a Bloom filter.

11. The method of claim 10, further comprising:

transmitting, by the application and to a platform associated with the first winning digital component, a first report including the list of unique identifiers; and uploading, by the platform associated with the first winning digital component to an aggregate reporting server, a batch of one or more reports that includes the first report.

12. The method of claim 10, further comprising:

transmitting, by the application and to an aggregate reporting server, a first report including the list of unique identifiers.

13. A system comprising:

one or more processors; and one or more memory elements including instructions that, when executed, cause the one or more processors to perform operations including:

receiving, by a first server of a secure multi-party computation (MPC) system and from an application on a user device, a request for digital content, wherein the request comprises a first secret share of an application instance identifier that identifies the application instance associated with the device, or the device itself;

in response to receiving the request and by the first server of the secure MPC system:

conducting, in collaboration with a second server of the secure MPC system, a privacy-preserving selection process to select a first winning digital component from among a set of digital components, wherein each digital component has a corresponding (i) unique experiment identifier and (ii) unique control identifier, the conducting comprising:

for each digital component in the set of digital components:

determining, in collaboration with the second server and based on a set of eligibility rules, a first secret share of a candidate parameter that represents whether the digital component is an eligible candidate for selection in the privacy-preserving selection process;

determining, in collaboration with the second server and based on the first secret share of the application instance identifier and respective first secret shares of candidate parameter values, a secret share of an experiment parameter that represents whether the application is in an experiment group for the digital component;

generating, based on the first secret share of the candidate parameter for each digital component and a selection value for each digital component, a first secret share of a selection result representing the first winning digital component; and generating a response to the request for digital content, the response comprising the first secret share of the selection result and, for each of one or more digital components including the first winning digital component, data representing whether the application is in the experiment group for the digital component or a control group for the digital component; and transmitting, by the first server of the secure MPC system and to the application on the user device, the response to the request for digital content.

14. The system of claim 13, wherein the data representing whether the application is in the experiment group for the digital component or a control group for the digital component is represented by a Bloom filter.

15. The system of claim 14, wherein conducting a privacy-preserving selection process to select a first winning digital component comprises:

for each digital component in the set of digital components:

adding, to the Bloom filter, a corresponding (i) unique experiment identifier if the application is in the experiment group, or (ii) unique control identifier if the application is in the control group.

16. The system of claim 13, wherein determining the secret share of an experiment parameter that represents whether the application is in an experiment group for the digital component comprises:

determining, for each experiment of a set of experiments associated with the digital component, whether the application is part of a control group or an experiment group with respect to each digital component.

17. The system of claim 13, further comprising the second server of the secure multi-party computation system.

18. A non-transitory computer storage medium encoded with instructions that when executed by a distributed computing system cause the distributed computing system to perform operations comprising:

receiving, by a first server of a secure multi-party computation (MPC) system and from an application on a user device, a request for digital content, wherein the request comprises a first secret share of an application instance identifier that identifies the application instance associated with the device, or the device itself;

in response to receiving the request and by the first server of the secure MPC system:

conducting, in collaboration with a second server of the secure MPC system, a privacy-preserving selection process to select a first winning digital component from among a set of digital components, wherein each digital component has a corresponding (i) unique experiment identifier and (ii) unique control identifier, the conducting comprising:

for each digital component in the set of digital components:

determining, in collaboration with the second server and based on a set of eligibility rules, a first secret share of a candidate parameter that represents whether the digital component is an eligible candidate for selection in the privacy-preserving selection process;

determining, in collaboration with the second server and based on the first secret share of the application instance identifier and respective first secret shares of candidate parameter values, a secret share of an experiment parameter that represents whether the application is in an experiment group for the digital component;

generating, based on the first secret share of the candidate parameter for each digital component and a selection value for each digital component, a first secret share of a selection result representing the first winning digital component; and generating a response to the request for digital content, the response comprising the first secret share of the selection result and, for each of one or more digital components including the first winning digital component, data representing whether the application is in the experiment group for the digital component or a control group for the digital component; and transmitting, by the first server of the secure MPC system and to the application on the user device, the response to the request for digital content.

19. The non-transitory computer storage medium of claim 18, wherein the data representing whether the application is in the experiment group for the digital component or a control group for the digital component is represented by a Bloom filter.

20. The non-transitory computer storage medium of claim 19, wherein conducting a privacy-preserving selection process to select a first winning digital component comprises:

for each digital component in the set of digital components:

adding, to the Bloom filter, a corresponding (i) unique experiment identifier if the application is in the experiment group, or (ii) unique control identifier if the application is in the control group.

* * * * *

UNITED STATES PATENT AND TRADEMARK OFFICE
CERTIFICATE OF CORRECTION

| | |
|---|---|
| PATENT NO. | : 12,130,893 B2 |
| APPLICATION NO. | : 17/924897 |
| DATED | : October 29, 2024 |
| INVENTOR(S) | : Wang et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 224 days.

Signed and Sealed this
Twenty-second Day of April, 2025

Coke Morgan Stewart
*Acting Director of the United States Patent and Trademark Office*